(12) United States Patent
Kashiwa et al.

(10) Patent No.: US 12,292,730 B2
(45) Date of Patent: May 6, 2025

(54) INFORMATION PROCESSING DEVICE, EVALUATION METHOD, AND COMPUTER-READABLE RECORDING MEDIUM

(71) Applicant: YOKOGAWA ELECTRIC CORPORATION, Tokyo (JP)

(72) Inventors: Ryosuke Kashiwa, Tokyo (JP); Toshiaki Omata, Tokyo (JP); Nobuaki Ema, Tokyo (JP); Yoshitaka Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 365 days.

(21) Appl. No.: 17/895,580

(22) Filed: Aug. 25, 2022

(65) Prior Publication Data
US 2023/0065835 A1 Mar. 2, 2023

(30) Foreign Application Priority Data
Aug. 31, 2021 (JP) .................................. 2021-141673

(51) Int. Cl.
*G05B 19/418* (2006.01)
(52) U.S. Cl.
CPC .. *G05B 19/41835* (2013.01); *G05B 19/41865* (2013.01)
(58) Field of Classification Search
CPC ........ G05B 19/41835; G05B 19/41865; G06Q 50/06; G06Q 50/205; G06Q 10/06398; G06Q 50/04; Y02P 90/30
See application file for complete search history.

(56) References Cited

U.S. PATENT DOCUMENTS

2004/0204908 A1* 10/2004 Hosaka ................... F01K 13/02
                                                         702/182
2007/0143083 A1*  6/2007 Kropaczek ............... G21C 7/00
                                                         703/2

(Continued)

FOREIGN PATENT DOCUMENTS

JP         2008-59144 A       3/2008
JP         2008-165193 A      7/2008

(Continued)

OTHER PUBLICATIONS

Japanese Office Action (JPOA) mailed on Jan. 30, 2024 and issued for Japanese patent application No. 2021-141673 and its English machine translation.

(Continued)

*Primary Examiner* — Ziaul Karim
(74) *Attorney, Agent, or Firm* — RANKIN, HILL & CLARK LLP

(57) ABSTRACT

When a worker executes an operation on an actual plant, an information processing device generates a first calculation result obtained by calculating a behavior of the actual plant after execution of the operation using a virtual plant following an operational status of the actual plant and generates each second calculation result obtained by calculating a behavior of the actual plant with respect to each of operation pattern plans corresponding to a state of the actual plant. The information processing device evaluates the operation that is executed by the worker based on the first calculation result and the second calculation result.

8 Claims, 19 Drawing Sheets

(56) References Cited

U.S. PATENT DOCUMENTS

2016/0161926 A1* 6/2016 Tange .................. G05B 13/048
                                                    700/29
2019/0243325 A1* 8/2019 Kobayashi ....... G06Q 10/06398

FOREIGN PATENT DOCUMENTS

| JP | 2009-9301   A | 1/2009  |
| JP | 2011-8756   A | 1/2011  |
| JP | 2018-92511  A | 6/2018  |
| JP | 2019-135622 A | 8/2019  |
| JP | 2020168618  A | 10/2020 |

OTHER PUBLICATIONS

Japanese Office Action (JPOA) dated Aug. 29, 2023 for Japanese Patent Application No. 2021-141673; English machine translation.

* cited by examiner

FIG.3

| EVALUATION INDEX 1 | EVALUATION INDEX 2 | EVALUATION INDEX 3 | EVALUATION INDEX 4 | EVALUATION INDEX 5 |
|---|---|---|---|---|
| PRODUCTION (t) | AMOUNT OF CONSUMPTION OF RAW MATERIALS (t) | FACILITY LOAD FACTOR (%) | POWER CONSUMPTION (W) | EMITTED $CO_2$ (kg) |
| | | FINAL TARGET VALUE | | |
| X (t) | Y (t) | Z (%) | P (W) | Q (kg) |

FIG.8

| OPERATION PATTERN PLAN \ EVALUATION INDEX | PRODUCTION (t) | AMOUNT OF CONSUMPTION OF RAW MATERIALS (t) | FACILITY LOAD FACTOR (%) | POWER CONSUMPTION (W) | EMITTED $CO_2$ (kg) |
|---|---|---|---|---|---|
| OPERATION PATTERN PLAN 1 | 1.0 | 0.3 | 20 | 300 | 150 |
| ... | ... | ... | ... | ... | ... |
| OPERATION PATTERN PLAN n | ... | ... | ... | ... | ... |

INFORMATION PROCESSING DEVICE, EVALUATION METHOD, AND COMPUTER-READABLE RECORDING MEDIUM

CROSS-REFERENCE TO RELATED APPLICATION

The present application claims priority to and incorporates by reference the entire contents of Japanese Patent Application No. 2021-141673 filed in Japan on Aug. 31, 2021.

FIELD

The present disclosure relates to an information processing device, an evaluation method, and an evaluation program.

BACKGROUND

In various plants using petroleum, petrochemistry, chemistry, and gas, workers, or the like, (or operators, or the like) execute safe operations of the plants. For example, a worker, or the like, understands the tendency of operations in a plant based on actual measured values in the plant, such as temperatures, pressures, etc., that are obtained by various sensors like temperature sensors and flowmeters that are set in the plant, and the worker operates a control device, such as valves and heaters that are set in the plant, thereby operating the plant. Note that the operations herein include manual operations on site.

Recently, plant data, such as sensor values, actual measured values, and control values, is acquired in real time from a plant that is actual (sometimes referred to as the actual plant below) and a simulative or virtual plant is run and is utilized for operational assist to and education of workers, or the like (or operators, or the like), using the virtual plant (sometimes referred to as the mirror plant below) following the operational status of the actual plant.

Patent Literature 1: Japanese Laid-open Patent Publication No. 2009-9301
Patent Literature 2: Japanese Laid-open Patent Publication No. 2011-8756

SUMMARY

When a failure occurs in a plant, it not only makes it impossible to produce products but also has great effects on the surrounding areas due to a fire, etc., and an improvement in ability of operators and workers is directly linked to safe operations. Training of operators and workers however is often performed in a system different from an actual plant or performed impractically and tension and reality are insufficient in some cases and thus it is difficult to evaluate the training accurately.

An object of the disclosure is to evaluate operation of a worker, or the like, in charge of operating a plant.

According to an aspect of the embodiments, an information processing device includes, a calculation unit configured to, when a worker executes an operation on an actual plant, generate a first calculation result obtained by calculating a behavior of the actual plant after execution of the operation using a virtual plant following an operational status of the actual plant and generate each second calculation result obtained by calculating a behavior of the actual plant with respect to each of operation pattern plans corresponding to a state of the actual plant; and an evaluation unit configured to, based on the first calculation result and the second calculation result, evaluate the operation that is executed by the worker.

According to an aspect of the embodiments, an evaluation method that is performed by a computer, the method includes, when a worker executes an operation on an actual plant, generating a first calculation result obtained by calculating a behavior of the actual plant after execution of the operation using a virtual plant following an operational status of the actual plant and generating each second calculation result obtained by calculating a behavior of the actual plant with respect to each of operation pattern plans corresponding to a state of the actual plant, and based on the first calculation result and the second calculation result, evaluating the operation that is executed by the worker.

According to an aspect of the embodiments, a computer-readable recording medium stores therein an evaluation program that causes a computer to execute a process including, when a worker executes an operation on an actual plant, generating a first calculation result obtained by calculating a behavior of the actual plant after execution of the operation using a virtual plant following an operational status of the actual plant and generating each second calculation result obtained by calculating a behavior of the actual plant with respect to each of operation pattern plans corresponding to a state of the actual plant; and based on the first calculation result and the second calculation result, evaluating the operation that is executed by the worker.

BRIEF DESCRIPTION OF THE DRAWINGS

FIG. 3 is a diagram illustrating an example of information that is stored in an evaluation index DB;
FIG. 8 is a diagram illustrating a calculation result display example 1.

DESCRIPTION OF EMBODIMENTS

Figure 1:
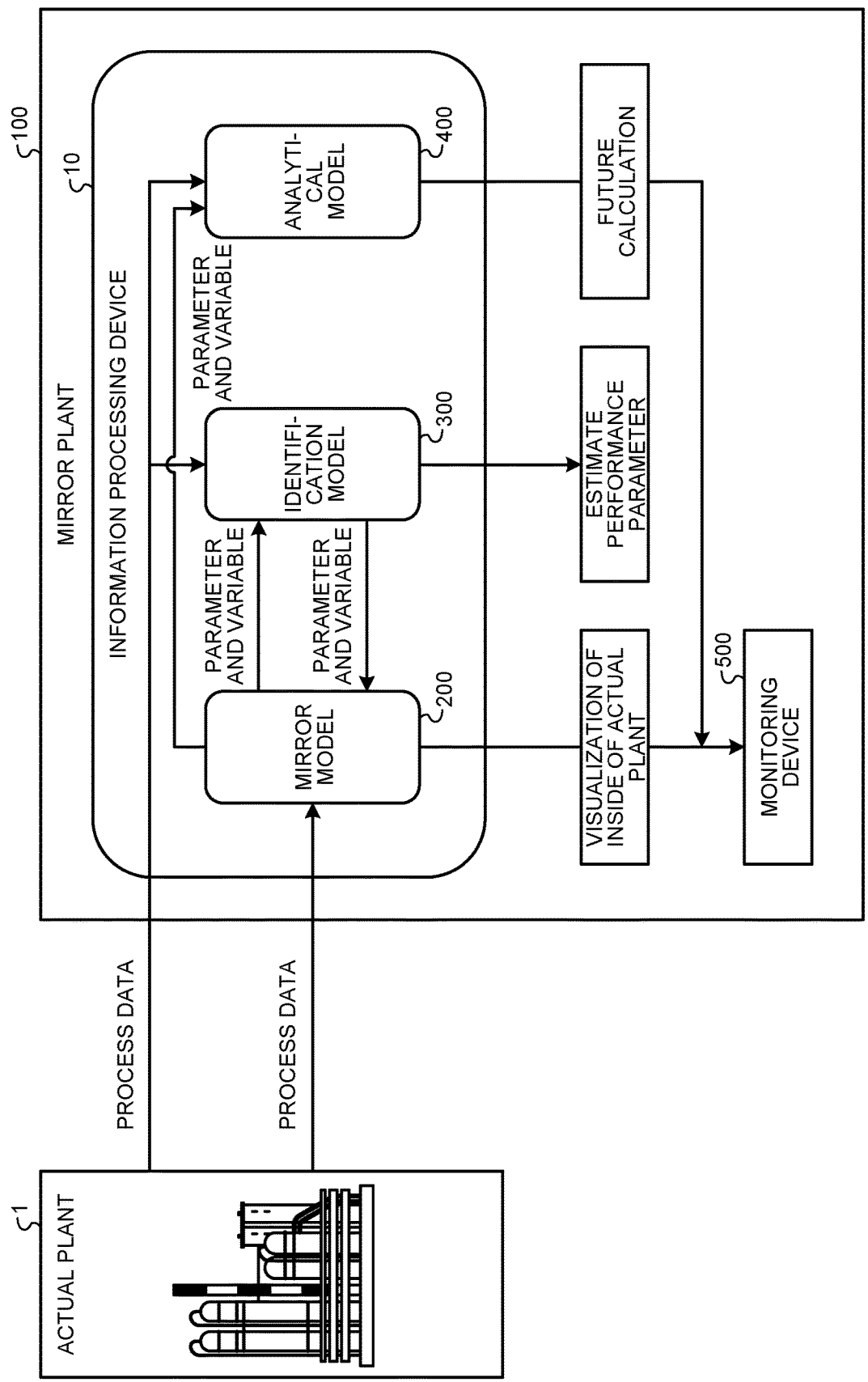
FIG. 1 is a diagram illustrating an example of an entire configuration of a system according to a first embodiment.

Embodiments of an information processing device, an evaluation method, and a computer-readable recording medium disclosed herein will be described in detail below with reference to the accompanying drawings. The embodiments do not limit the disclosure. The same components are denoted with the same reference numerals and redundant description will be omitted as appropriate and each embodiment can be combined as appropriate in a range without inconsistency.

First Embodiment

Entire Configuration

FIG. 1 is a diagram illustrating an example of an entire configuration of a system according to a first embodiment. As illustrated in FIG. 1, the system is a system that includes an actual plant 1 and a mirror plant 100, constructs a virtual plant following in real time the state of the actual plant 1, and realizes safe operations of the actual plant 1. In other words, the actual plant 1 is a plant that is constructed using actual devices and the mirror plant 100 is a virtual plant following the actual plant 1 that is constructed as software in a virtual space (cyber space). Note that the actual plant 1 and the mirror plant 100 are connected via a network regardless whether the network is wired or wireless.

The actual plant 1 is an example of various plants using petroleum, petrochemistry, chemistry, and gas and includes factories including various facilities for obtaining products. Examples of products are LNG (liquefied natural gas), resin (such as plastic and nylon), chemical products, etc. Examples of facilities are factory facilities, mechanical facilities, production facilities, power generation facilities, storage facilities, and facilities for drilling oil well, natural gas, etc., at well sites, etc.

The inside of the actual plant 1 is constructed using distributed control systems (DCS), etc. For example, although illustration in the drawings is omitted, the control system in the actual plant 1 executes various types of control on a control device, such as a field device that is set in a facility to be controlled, an operational device corresponding to the facility to be controlled, etc., using process data that is used in the actual plant 1.

Note that a field device is a device on site, such as an operational device including a measuring function of measuring an operational state (for example, the pressure, temperature, flow rate, etc.,) of a facility that is set and a function of controlling operations of the facility that is set according to a control signal that is input (for example, an actuator). The field device that is a sensor sequentially outputs the operational state of the facility that is set as process data to a controller in the control system and the field device that is an actuator controls running of a process according to a control signal that is computed by the controller.

The process data contains process variables (PV), setting variables (SV), manipulated variables (MV), etc. The process data further contains information on the type of the process variables that are output (for example, the pressure, temperature, flow rate, etc.). Information, such as a tag name that is assigned to identify the field device, is associated with the process data. The process variables that are output as the process data may include not only process variables that are measured by the field device that is a sensor but also calculated values that are calculated from the process variables and a manipulated variable value to the field device that is an actuator may be used. Calculation of a calculated value from the process variables may be performed by the field device or may be performed by an external device that is not illustrated in the drawings and that is connected to the field device.

The mirror plant 100 includes a mirror model 200, an identification model 300, and an analytical model 400 and is a virtual plant following in real time the state of the actual plant 1. It is possible to set, in the mirror plant 100, in addition to each device that is set in the actual plant 1, for example, a device virtually (as software) in a position, such as a place at a high temperature or a height where the device cannot be set in the actual plant 1 and virtually set a device that is not set due to costs, which enables provision of services that are effective to operate the actual plant 1 more accurately and stably. Description will be given here, taking an example in which an information processing device 10 executes each of the models; however, embodiments are not limited thereto, and different devices may execute the models, respectively.

The mirror model 200 operates in synchronization with the actual plant 1 in parallel and makes a simulation while acquiring data from the actual plant 1, thereby simulating behaviors of the actual plant 1 and at the same time estimating a quantity of state that is not measured in the actual plant 1 and visualizing the inside of the actual plant 1. For example, the mirror model 200 is a physical model that acquires the process data of the actual plant 1 and executes a real time simulation. In other words, the mirror model 200 realizes visualization of the state of the actual plant 1. For example, the mirror model 200 takes the process data acquired from the actual plant 1 in, follows the behaviors of the actual plant 1, and outputs the result of the following to a monitoring terminal device 500. As a result, the mirror model 200 is able to calculate behaviors of the actual plant 1 after execution of a certain operation by an operator in consideration of a device that is not in the actual plant 1 and provide the behaviors to an observer.

In order to cause the mirror model 200 to accord with the actual measured data of the actual plant 1, the identification model 300 estimates performance parameters of the device regularly based on the data that is acquired from the actual plant 1. For example, the identification model 300 is a physical model that adjusts an error between the mirror model 200 and the actual plant 1. In other words, the identification model 300 adjusts parameters of the mirror model 200, etc., as required at regular intervals or when the error between the mirror model 200 and the actual plant 1 is large. For example, the identification model 300 acquires the values of various parameters and variables indicating the performance from the mirror model 200, updates the values, and outputs the updated values of the parameters and variable to the mirror model 200. As a result, the values of the parameters and variables of the mirror model 200 are updated. The values of the parameters and variables include design data and operating data.

The analytical model 400 calculates a future operational state of the actual plant 1 based on the behaviors of the actual plant 1 that the mirror model 200 simulates. For example, the analytical model 400 performs a steady state calculation, a transient state calculation, a preventive diagnosis (abnormality diagnosis), etc. For example, the analytical model 400 is a physical model that executes a simulation in which the state of the actual plant 1 is analyzed. In other words, the analytical model 400 executes a future calculation on the actual plant 1. For example, by performing fast computation using the parameters and variables acquired from the mirror model 200 as initial values, the analytical model 400 is able to calculate behaviors of the actual plant 1 in a few minutes or hours from the current time and display the behavior as a trend graph.

In such a system, the information processing device 10 calculates a behavior of the actual plant 1 by simulation using the mirror plant 100 following the operational status of the actual plant 1 with respect to each of a plurality of operation pattern plans including operation information in which operations on the actual plant 1 and times of execution at which the operations are executed are associated with each other. The information processing device 10 outputs the operation pattern plans and respective calculation results in association with each other. This enables the information processing device 10 to present each of the operation patterns that a worker, or the like, can take to the worker, or the like, and enables the worker, or the like, to choose a more appropriate operation pattern.

Functional Configuration

Figure 2:
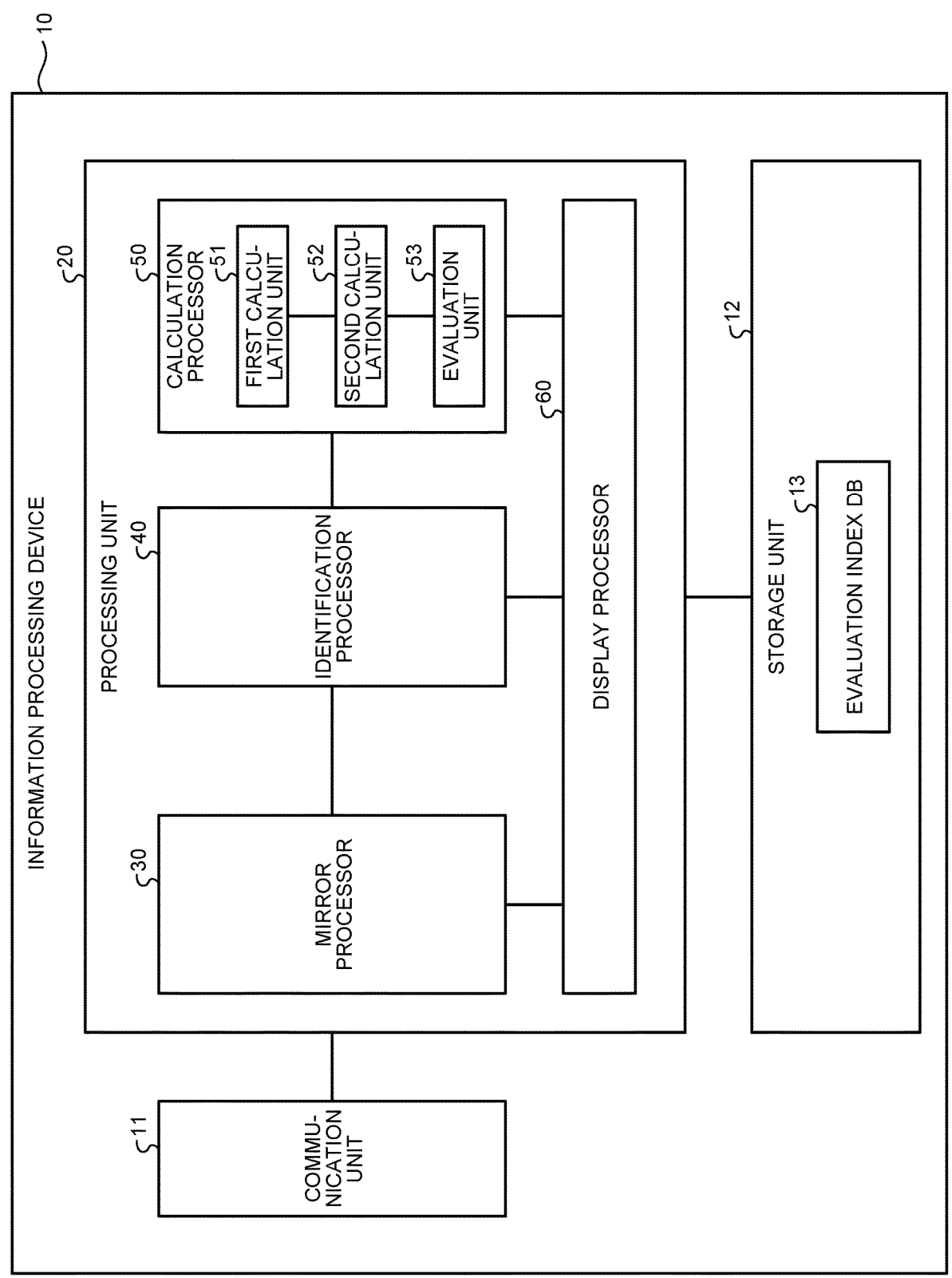
FIG. 2 is a functional block diagram illustrating a functional configuration of an information processing device according to the first embodiment.

FIG. 2 is a functional block diagram illustrating a functional configuration of the information processing device 10 according to the first embodiment. As illustrated in FIG. 2, the information processing device 10 includes a communication unit 11, a storage unit 12, and a processing unit 20.

The communication unit 11 is a processor that controls communication with another device and is realized by, for example, a communication interface. For example, the communication unit 11 controls communication with the actual plant 1 and acquires plant data, etc., in real time. The communication unit 11 transmits various types of information to the monitoring terminal device 500 to output the various types of information by display on the monitoring terminal device 500.

The storage unit 12 is a processor that stores various types of data and a program that is executed by the processing unit 20 and the storage unit 12 is realized by, for example, a memory or a hard disk. The storage unit 12 stores an evaluation index DB 13.

The evaluation index DB 13 is a database that stores each evaluation index serving as an index according to which an appropriate operation pattern is chosen from a plurality of operation patterns. In other words, the evaluation index DB 13 stores an index that evaluates the state and performance of the plant that is calculated by simulation. The information stored herein can be changed by a user freely within a range that can be calculated by simulation.

FIG. 3 is a diagram illustrating an example of the information that is stored in the evaluation index DB 13. As illustrated in FIG. 3, the evaluation index DB 13 stores a plurality of evaluation indices and final target values of the respective evaluation indices in association with each other. In the example in FIG. 3, a production (t), an amount of consumption of raw materials (t), a facility load factor (%), a power consumption (W), and emitted $CO_2$ (kg) are set.

The production is an index representing the amount of products of the actual plant 1 and X (t) is set as a final target value. The amount of consumption of raw materials is an index representing the amount of consumption of raw materials of the products that are generated in the actual plant 1 and Y (t) is set as a final target value. The facility load factor is an index representing the load factor of each device and facility by which the actual plant 1 is run and Z (%) is set as a final target value. The power consumption is an index representing the amount of consumption of power by which the actual plant 1 is run and P (W) is set as a final target value. The emitted $CO_2$ (kg) is an index representing the amount of carbon dioxide that is emitted when the actual plant 1 is run and Q (kg) is set as a final target value.

The processing unit 20 is a processor that controls the entire information processing device 10 and the processing unit 20 is realized by, for example, a processor. The processing unit 20 includes a mirror processor 30, an identification processor 40, a calculation processor 50, and a display processor 60. The mirror processor 30, the identification processor 40, the calculation processor 50, and the display processor 60 are realized by an electric circuit that the processor includes and a process that the processor executes, etc.

The mirror processor 30 is a processor that executes visualization of the state of the actual plant 1. Specifically, the mirror processor 30 acquires process data in real time from the actual plant 1 and follows and visualizes the state of the actual plant 1 by a real time simulation using a physical model. In other words, the mirror processor 30 uses the mirror model 200 described above.

The identification processor 40 is a processor that adjust an error between the simulation made by the mirror processor 30 and the actual plant 1. Specifically, the identification processor 40 updates the values of various parameters and variables that are used in the simulation made by the mirror processor 30. In other words, the identification processor 40 generates the identification model 300 described above.

The calculation processor 50 is a processor that includes a first calculation unit 51 and a second calculation unit 52 and that calculates a future state of the actual plant 1 by executing a simulation in which the state of the actual plant 1 is analyzed and the calculation processor 50 uses the analytical model 400 described above.

The first calculation unit 51 is a processor that calculates behaviors of the actual plant 1 in a few minutes or hours from the current time and that generates a trend graph. Specifically, the first calculation unit 51 executes a simulation for calculating a behavior when the worker, or the like (or an operator or the like), issues an instruction regularly or at any timing, such as the case where an operation occurs in the actual plant 1, or the like. In the first embodiment, the worker, or the like (or the operator, or the like), is simply referred to as "the worker, or the like".

For example, when the worker executes an operation of "setting the temperature of a facility A at 50 degrees" on the actual plant 1 at a time T, the first calculation unit 51 simulates the state of the actual plant 1 at and after the time T by simulation using operation information that "the temperature of the facility A=50 degrees" as an input. The state of the actual plant 1 that is simulated here corresponds to the amount of products of the actual plant 1, the quantity of the state of the actual plant 1 including the pressure and temperature of a device on which the facility A has an effect, etc.

Figure 4:
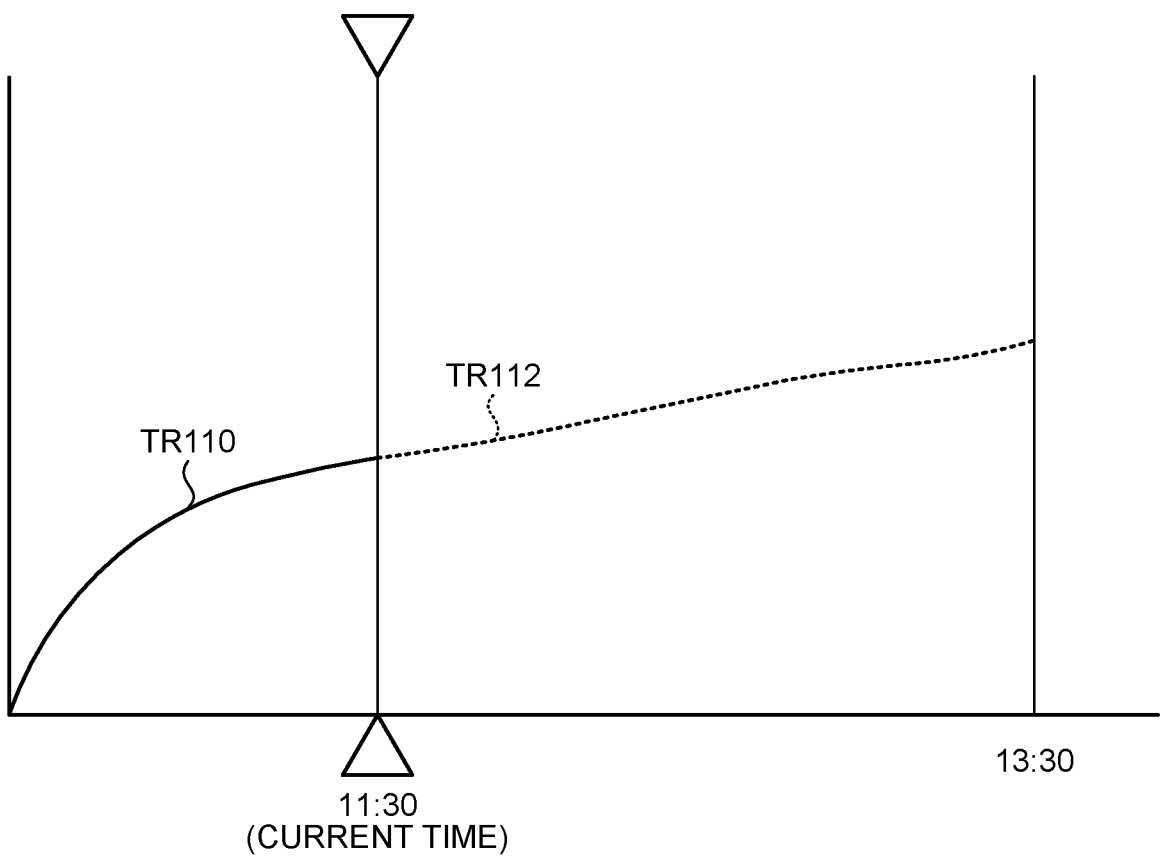
FIG. 4 is a diagram illustrating a trend graph of the state of an actual plant according to a simulation.

FIG. 4 is a diagram illustrating a trend graph of the state of the actual plant 1 according to a simulation. As illustrated in FIG. 4, the first calculation unit 51 generates a trend graph in which the horizontal axis represents the time and the vertical axis represents the state of the actual plant 1. TR110 on the trend graph illustrated in FIG. 4 is the actual measured value and TR112 is the calculation data at and after the current time.

The second calculation unit 52 is a processor that calculates each of behaviors of the actual plant 1 in the case where a plurality of operation pattern plans are executed by simulation using the plant data that is acquired in the actual plant 1. Specifically, using the mirror model 200, the second calculation unit 52 calculates a future state in a specified period (or between steps) from a current process state value from which the calculation is started and each of the operation pattern plans.

For example, the second calculation unit 52 receives a setting of a simulation period including a start time and an end time, which is a setting made by the worker, or the like. When the start time comes, the second calculation unit 52 collects the state of the actual plant 1 and generates a plurality of operation pattern plans using the collected information. With respect to each of the operation pattern plans, the second calculation unit 52 calculates a calculation value of each of the evaluation indices at the end time by a simulation using a physical model that is generated previously and a model (for example, the mirror model 200) that is identified with the actual plant 1.

More specifically, by simulation using each virtual operation contained in the operation pattern plan and each numerical value, such as a process value representing the state of the actual plant 1, as inputs, the second calculation unit 52 generates a result of calculation containing each evaluation index at the time of execution of each virtual operation, transition of each evaluation index at the time when the operation pattern plan is executed, and a calculation value of each of the evaluation indices at the end time. The second calculation unit 52 outputs the result of the simulation (calculation result) to the display processor 60 and stores the result in the storage unit 12.

Each of the operation pattern plans may be prepared by the worker, or the like, previously, may be generated automatically by the second calculation unit 52 from a log in the past, or the like, or may be calculated by a machine learning model or a dedicated simulator.

The display processor 60 is a processor that outputs the simulation result by display. For example, the display processor 60 outputs each calculation result that is generated by the second calculation unit 52 by display on each device, such as a display unit (not illustrated in the drawings) of the information processing device 10, a monitoring terminal of the actual plant 1, or a terminal device that the worker, or the like, uses.

Specific Example of Calculation (Simulation)

Using FIGS. 5 to 7, specific examples of calculation (simulation) by the second calculation unit 52 will be described next. Assume that the worker, or the like, specifies a start time (12:00) and an end time (14:00) as a simulation period. The specific examples can be combined as appropriate within a range without inconsistency.

Specific Example 1

Figure 5:
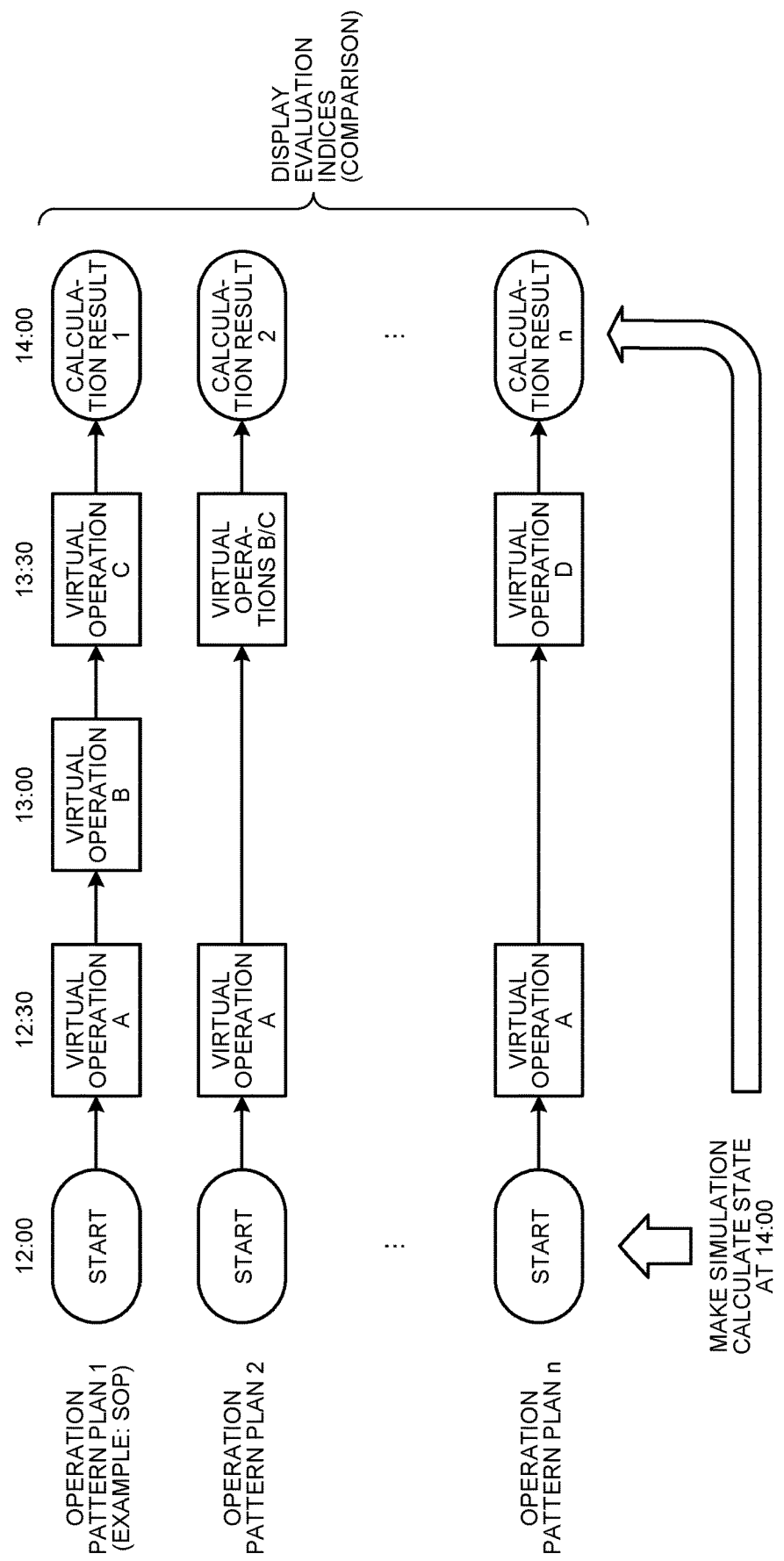
FIG. 5 is a diagram illustrating a specific example 1 of a calculation.

FIG. 5 is a diagram illustrating a specific example 1 of calculation. As illustrated in FIG. 5, when the start time (12:00) comes, the second calculation unit 52 generates n operation pattern plans from an operation pattern plan 1 to an operation pattern plan n. The operation pattern plans may include a standard operating procedure (SOP) of the actual plant 1 that is digitized.

For example, the operation pattern plan 1 is information that defines an operation from 12:00 to 14:00 and is a pattern in which a virtual operation A is executed at 12:30, a virtual operation B is executed at 13:00, and a virtual operation C is executed at 13:30. For example, the operation pattern plan 1 is identical with the SOP of the actual plant 1.

The operation pattern plan 2 is information that defines an operation from 12:00 to 14:00 and is a pattern in which the virtual operation A is executed at 12:30 and the virtual operation B and the virtual operation C are executed at 13:30. Note that the virtual operations correspond to specific operations for operating the plant, such as "setting the temperature of the facility A at 50 degrees", "closing a valve by 20%", and "increasing input of materials by 10%".

With respect to each of the operation pattern plans 1 to n, the second calculation unit 52 calculates each of calculation results 1 to n by simulations made by the mirror model 200. In other words, with respect to each of the operation pattern plans, for example, at the point of the current time 12:00, the second calculation unit 52 calculates a state of the actual plant 1 at 14:00. Note that the calculation results include "a production (t), an amount of consumption of raw materials (t), a facility load factor (%), a power consumption (W), and emitted $CO_2$ (kg)".

In this manner, the second calculation unit 52 calculates a change in the state of the actual plant 1 in the case where each of the virtual operation pattern plans is executed in the simulation period that is specified by the worker, or the like.

Specific Example 2

The second calculation unit 52 may execute a simulation using the process value at the time and the identification model 300 regularly or after each operation is performed and update the calculation result (the evaluation indices). Thus, in a specific example 2, an example in which the second calculation unit 52 executes a re-simulation at the timing of execution of each virtual operation contained in the operation pattern plan and updates the calculation result at the end time will be described. Note that the re-simulation may be executed, for example, after the mirror model 200 is updated by the identification model 300.

Figure 6:
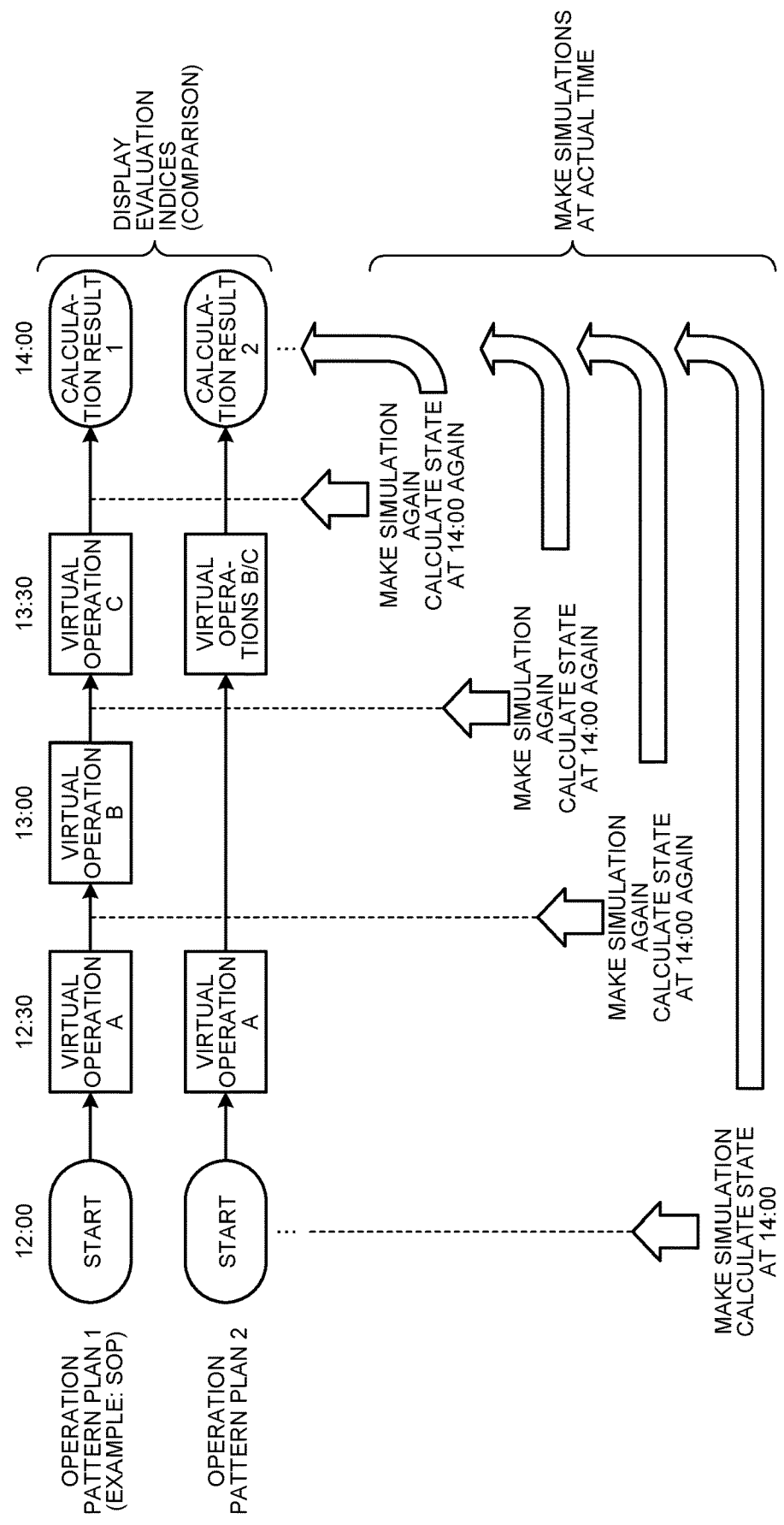
FIG. 6 is a diagram illustrating a specific example 2 of calculation.

FIG. 6 is a diagram illustrating the specific example 2 of calculation. As illustrated in FIG. 6, when a start time (12:00) comes, the second calculation unit 52 generates a process value, etc., at the time and generates two operation pattern plans that are the operation pattern plan 1 and the operation pattern plan 2. Note that the operation pattern plan 1 and the operation pattern plan 2 are the operation pattern plans illustrated in the specific example 1.

With respect to each of the operation pattern plan 1 and the operation pattern plan 2, the second calculation unit 52 calculates a state of the actual plant 1 at the end time (14:00) at the point of the start time (12:00) by a simulation using the process value at the start time (12:00) and the mirror model 200, etc.

Subsequently, when "12:30" comes, it is the state where the virtual operation A is executed at "12:30" with respect to the operation pattern plan 1 and the operation pattern plan 2. The second calculation unit 52 executes a re-simulation with respect to each of the operation pattern plan 1 and the operation pattern plan 2. In other words, the second calculation unit 52 acquires the process value, etc., at the point of "12:30" and re-calculates a state of the actual plant 1 at the end time (14:00) at the point of "12:30" by a simulation using the process value and each virtual operation of the operation pattern plan 1 at and after 12:30. Similarly, also with respect to the operation pattern plan 2, the second calculation unit 52 re-calculates a state of the actual plant 1 at the end time (14:00) at the point of "12:30" by a simulation using the process value at the current time and each virtual operation at and after the current time.

Subsequently, when "13:00" comes, it is the state where the virtual operation B is executed at "13:00" with respect to the operation pattern plan 1. The second calculation unit 52 executes a re-simulation with respect to each of the operation pattern plan 1. In other words, the second calculation unit 52 acquires the process value, etc., at the point of "12:30" and re-calculates a state of the actual plant 1 at the end time (14:00) at the point of "13:00" by a simulation using the process value and each virtual operation of the operation pattern plan 1 at and after 13:00.

Subsequently, when "13:30" comes, it is the state where the virtual operation C is executed at "13:30" with respect to the operation pattern plan 1 and it is the state where the virtual operation B and the virtual operation C are executed at "13:30" with respect to the operation pattern plan 2. The second calculation unit 52 executes a re-simulation with respect to each of the operation pattern plan 1 and the operation pattern plan 2. In other words, the second calculation unit 52 acquires the process value, etc., at the point of "13:30" and re-calculates a state of the actual plant 1 at the end time (14:00) at the point of "13:30" by a simulation using the process value and each virtual operation of the operation pattern plan 1 at and after 13:30. Similarly, also with respect to the operation pattern plan 2, the second calculation unit 52 re-calculates a state of the actual plant 1 at the end time (14:00) at the point of "13:30" by a simulation using the process value at the current time and each virtual operation at and after the current time.

In this manner, by updating the calculation result in the simulation period that is specified by the worker, or the like, the second calculation unit 52 calculates a change in the state of the actual plant 1 in the case where each of the virtual operation pattern plans is executed while following the actual state of the actual plant 1.

In the case where, after a simulation is executed, a disturbance by which the air temperature or the temperature changes by a threshold or more and that has an effect on operating the actual plant 1 occurs, the second calculation unit 52 is also able to acquire the process value after occurrence of the disturbance and execute a re-simulation. In Specific Example 3, the example where the second calculation unit 52 re-executes a simulation after occurrence of a disturbance and updates a calculation result at an end time will be described.

Figure 7:
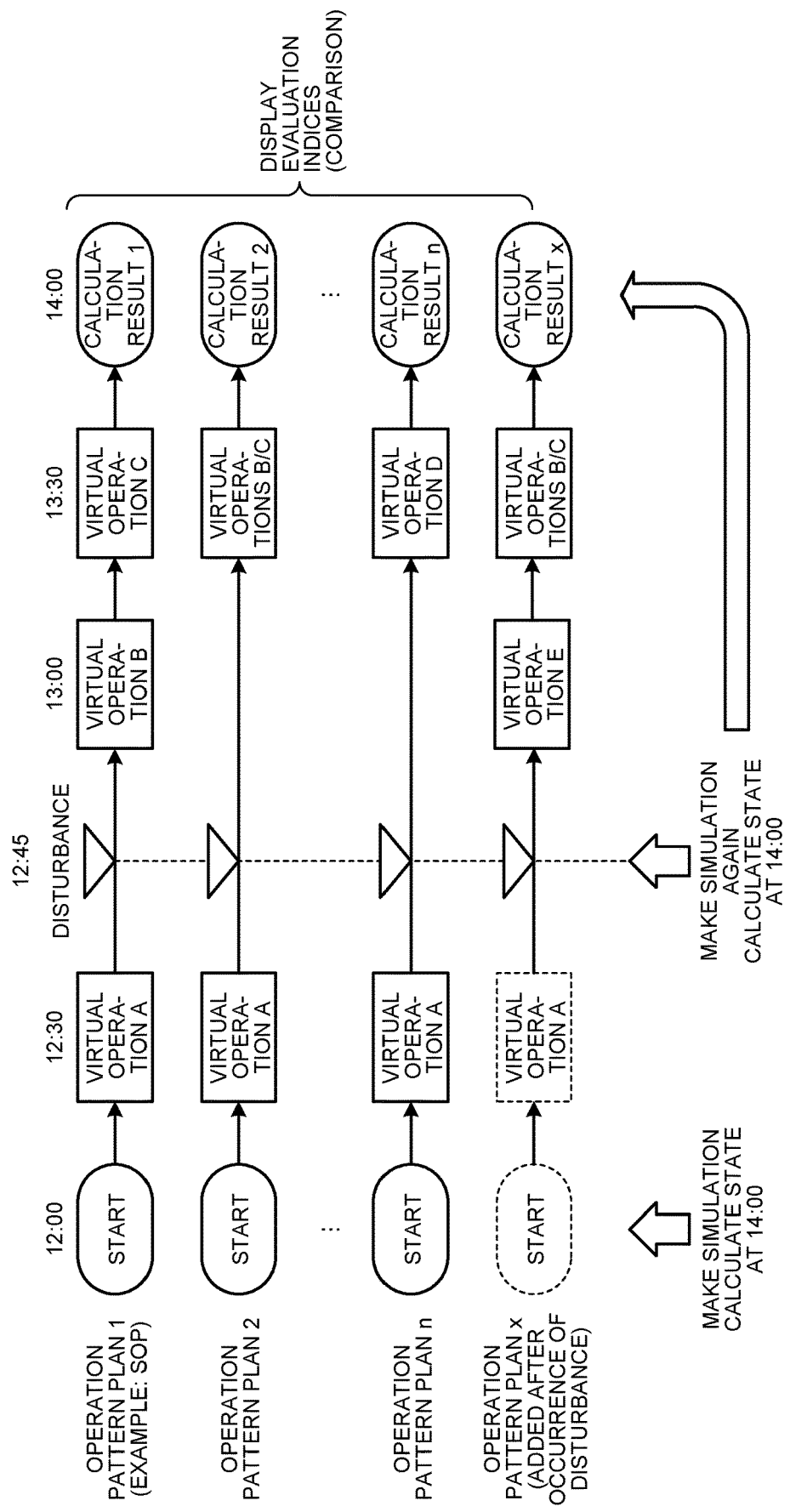
FIG. 7 is a diagram illustrating a specific example 3 of calculation.

FIG. 7 is a diagram illustrating a specific example 3 of calculation. As illustrated in FIG. 7, as in the specific example 1, when a start time (12:00) comes, the second calculation unit 52 generates n operation pattern plans from the operation pattern plan 1 to an operation pattern plan n. As in the specific example 1, with respect to each of the operation pattern plans 1 to n, the second calculation unit 52 calculates each of calculation results 1 to n by a simulation. Note that the operation pattern plans 1 to n are the operation pattern plans illustrated in the specific example.

Thereafter, when a disturbances occurs at 12:45, a re-simulation is executed using the process value after occurrence of the disturbance. For example, with respect to each operation pattern plan, the second calculation unit 52 re-calculates a state of the actual plant 1 at an end time (14:00) at a point of time after occurrence of the disturbance by a simulation using virtual operations at and after 12:45 and the process value at and after occurrence of the disturbance.

The second calculation unit 52 is also able to generate a new operation pattern x after occurrence of the disturbance and execute a simulation on the new operation pattern x. For example, the second calculation unit 52 generates an operation pattern plan x after occurrence of a disturbance by specifying an operation pattern corresponding to the disturbance having occurred from a log in the past, by specifying an operation pattern using a machine learning model that outputs an operation pattern according to an input of information on the disturbance, and receives an input of the operation pattern from a manager, or the like. The operation pattern plan x that is generated here is information that defines operations from 12:45 to 14:00 and is a pattern in which a virtual operation E is executed at 13:00 and the virtual operation B and the virtual operation C are executed at 13:30.

With respect to the operation pattern plan x, the second calculation unit 52 calculates a calculation result x by the above-described simulation. In other words, the second calculation unit 52 newly calculates a state of the actual plant 1 at 14:00 at the point of a time (12:45) after occurrence of the disturbance.

As described above, when a disturbance occurs, the second calculation unit 52 is able to update the calculation result of each operation pattern plan on which a simulation has been made and generate a calculation result of the new pattern plan.

Specific Example of Display of Calculation Result

Using FIGS. 8 to 12, an example of display of a result of calculation obtained by the second calculation unit 52 will be described next. For example, according to a setting that is made by the worker, or the like, or an operation performed by the worker, or the like, the display processor 60 displays each operation pattern plan comparably by a display form, such as a matrix display, a radar chart or a trend chart. Note that the calculation result displayed herein is calculated by any one of the methods illustrated using FIGS. 5 to 7.

Display Specific Example 1

FIG. 8 is a diagram illustrating a calculation result display example 1. As illustrated in FIG. 8, the display processor 60 generates a matrix screen (display form screen) in which "the operation pattern plans" are set for the vertical axis and "the amounts of production (t), amount of consumption of raw materials (t), facility load factors (%), power consumptions (W), and emitted $CO_2$ (kg)" that are the calculation results are set for the horizontal axis, sets values that are calculated by simulations in the respective cells, and outputs the values by display on a display or the monitoring terminal device 500. For example, as for the operation pattern plan 1, it is presented that the production is "1.0 t", the amount of consumption of raw materials is "0.3 t", the facility load factor is "20%", the power consumption is "300 W", and the emitted $CO_2$ is "150 kg" by simulation.

Display Specific Example 2

Figure 9:
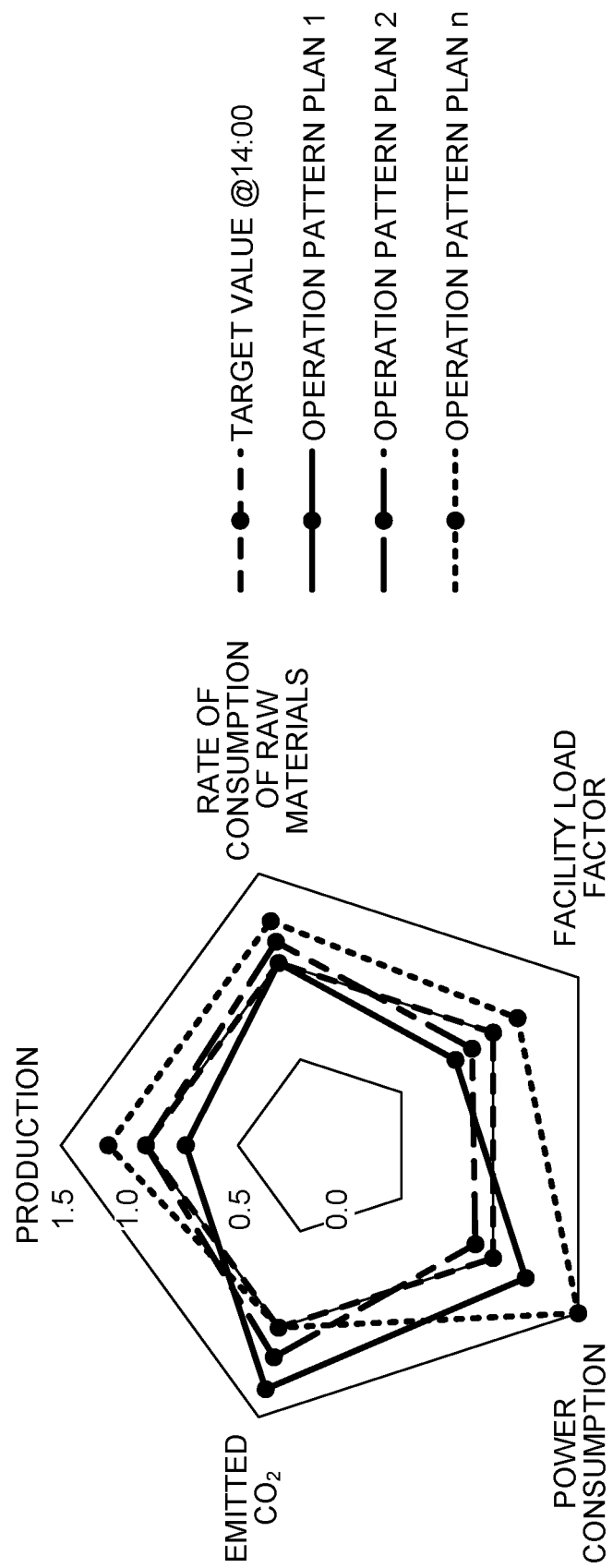
FIG. 9 is a diagram illustrating a calculation result display example 2.

FIG. 9 is a diagram illustrating a calculation result display example 2. As illustrated in FIG. 9, the display processor 60 is able to display a calculation result in a form of radar chart. The display processor 60 generates a radar chart with apexes representing evaluation indices (the production (t), the amount of consumption of raw materials (t), the facility load factor (%), the power consumption (W), and the emitted $CO_2$ (kg)) and displays calculation results of respective operation pattern plans. The display processor 60 may display final target values of the respective evaluation indices illustrated in FIG. 3 and target values of the respective evaluation indices at an end time (14:00) that is calculated at a start time (12:00) of a simulation period. The target values of the respective evaluation indices at the end time (14:00) are calculated by the calculation processor 50 using the physical model, the mirror model 200, or the like, are set by the manager, or the like, and are determined based on a log in the past.

Display Specific Example 3

Figure 10:
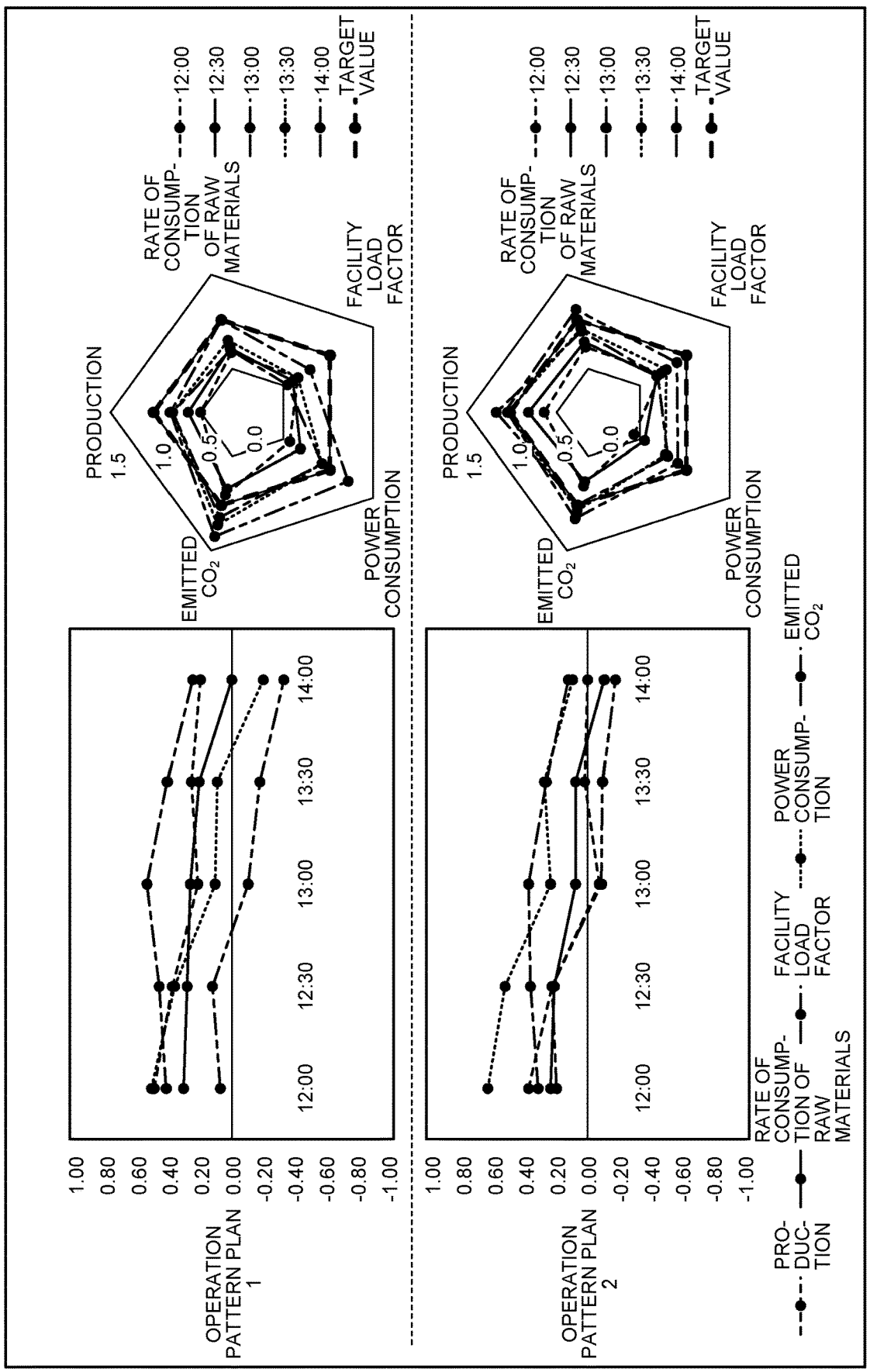
FIG. 10 is a diagram illustrating a calculation result display example 3.

FIG. 10 is a diagram illustrating a calculation result display example 3. As illustrated in FIG. 10, the display processor 60 is able to display a transition of a calculation result (each evaluation index) in addition to a radar chart form. Specifically, with respect to the operation pattern plan 1, the display processor 60 makes a chronological display of the calculation results (each evaluation index) at 12:30 (the virtual operation A), at 13:00 (the virtual operation B), and at 13:30 (the virtual operation C) at which the virtual operations are executed, thereby displaying a transition of the calculation results.

The display processor 60 is also able to display, with respect to each operation pattern, the chronological transition of the calculation results and the radar chart form of the calculation results at the respective times on the same screen. It is possible to display target values that are set previously as required. The display processor 60 is also able to switch between the matrix display, the radar chart form display, and the chronological display by an operation performed by the worker, or the like.

Display Specific Example 4

Figure 11:
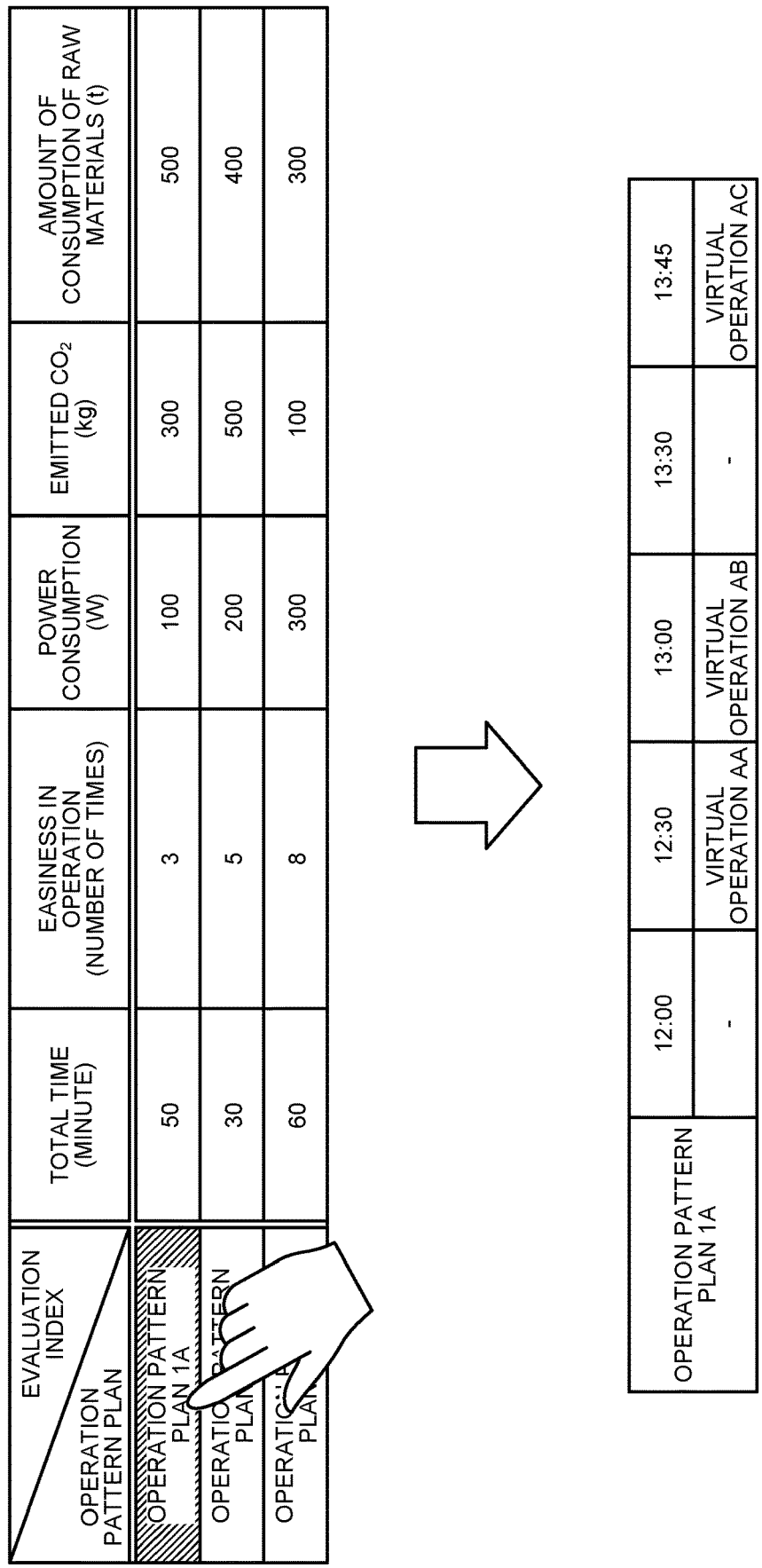
FIG. 11 is a diagram illustrating a calculation result display example 4.

The display processor 60 is also able to change the display according to an operation performed by the worker, or the like. FIG. 11 is a diagram illustrating a calculation result display example 4. FIG. 11 illustrates, as another example of the calculation results, an example in which "the total times (minute), easiness in operation (the number of times), power consumption (W), emitted $CO_2$ (kg), amount of consumption of raw materials (t)" are evaluation indices. Note that "a total time (minute)" represents the time required to execute each virtual operation and "easiness in operation" is the number of times of virtual operations that are contained in a simulation period.

As illustrated in FIG. 11, the display processor 60 displays calculation results of an operation pattern plan 1A, an operation pattern plan 2A, and an operation pattern plan 3A in a matrix form. When "the operation pattern plan 1A" is chosen in this state, the display processor 60 displays details of the operation pattern plan 1A. For example, the display processor 60 displays, as detailed information of the operation pattern plan 1A, that the operation pattern plan 1A includes "a virtual operation AA at 12:30, a virtual operation AB at 13:00, and a virtual operation AC at 13:45".

Figure 12:
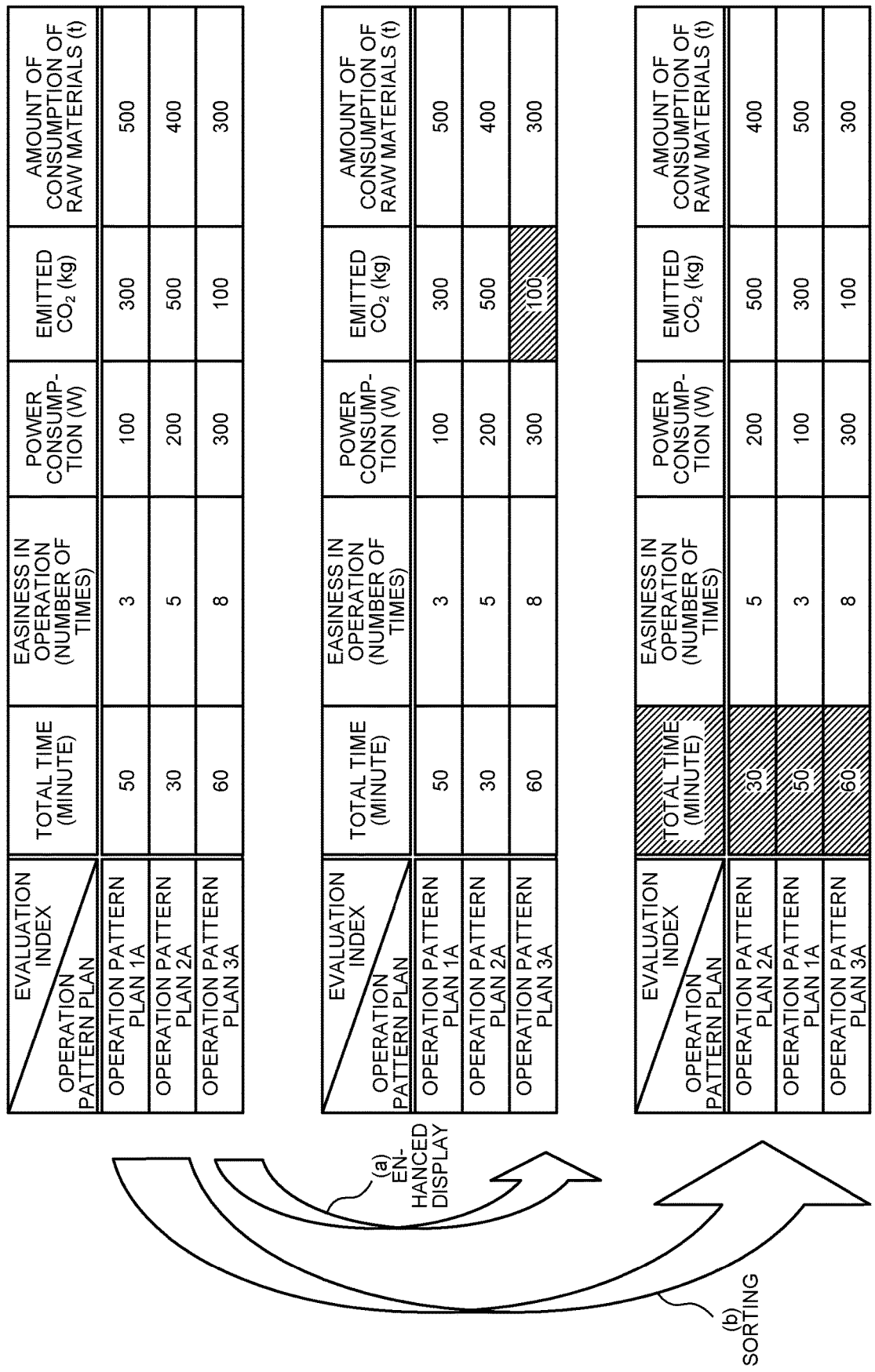
FIG. 12 is a diagram illustrating an example of changes in displaying operation patterns.

The display processor 60 is able to display information, which is displayed in a matrix form, in an enhanced manner or sorts the information. FIG. 12 is a diagram illustrating an example of a changes in displaying operation patterns.

For example, as illustrated in FIG. 12(a), when "emitted $CO_2$ (kg)" is chosen on the display screen in the matrix form, the display processor 60 displays "emitted $CO_2$ (kg)=100" of "the operation pattern plan 3A" that is the smallest "emitted $CO_2$ (kg)" among the operation pattern plans 1A, 2A and 3A in an enhanced manner.

As illustrated in FIG. 12(b), when "total time (minute)" is chosen on the display screen in the matrix form, the display processor 60 sorts the operation pattern plans 1A, 2A and 3A in an ascending order of "the total time (minute)" and displays the operation pattern plans 1A, 2A and 3A.

The examples are described as examples using the matrix form here; however, display is not limited to this, and enhanced display or sorted display can be executed even in a radar chart form display or a chronological display.

Flow of Trend Display Process

Figure 13:
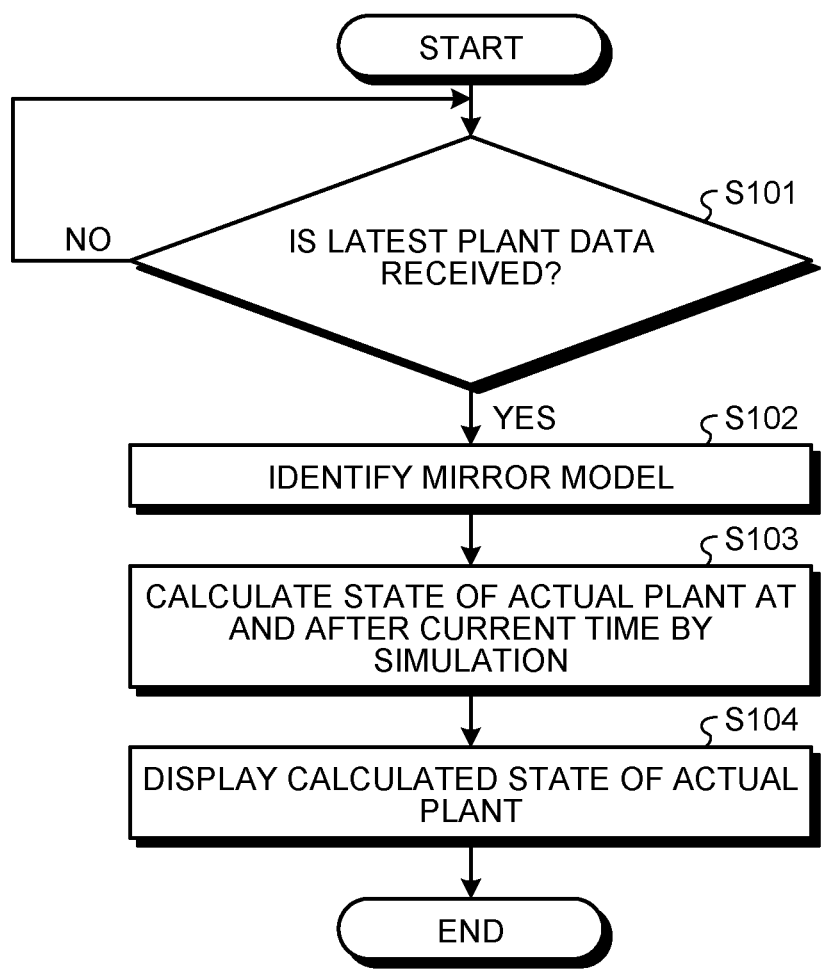
FIG. 13 is a flowchart illustrating a flow of a trend display process.

FIG. 13 is a flowchart illustrating a flow of a trend display process. As illustrated in FIG. 13, when the first calculation unit 51 acquires the latest plant data (YES at S101), the identification model 300 estimates a performance parameter of a device and performs an identification process on the mirror model 200 (S102) and the first calculation unit 51 calculates a state of the actual plant at and after the current time by simulation (S103).

The first calculation unit 51 then generates a trend graph that displays the result of the calculation and outputs the trend graph by display in a form like that in FIG. 4 on the monitoring terminal device 500 (S104). Any terminal device, such as the monitoring terminal device of the actual plant 1 or a smartphone or a mobile terminal device of the worker, can be set as the terminal device on which the display is made.

Flow of Calculation Process

Figure 14:
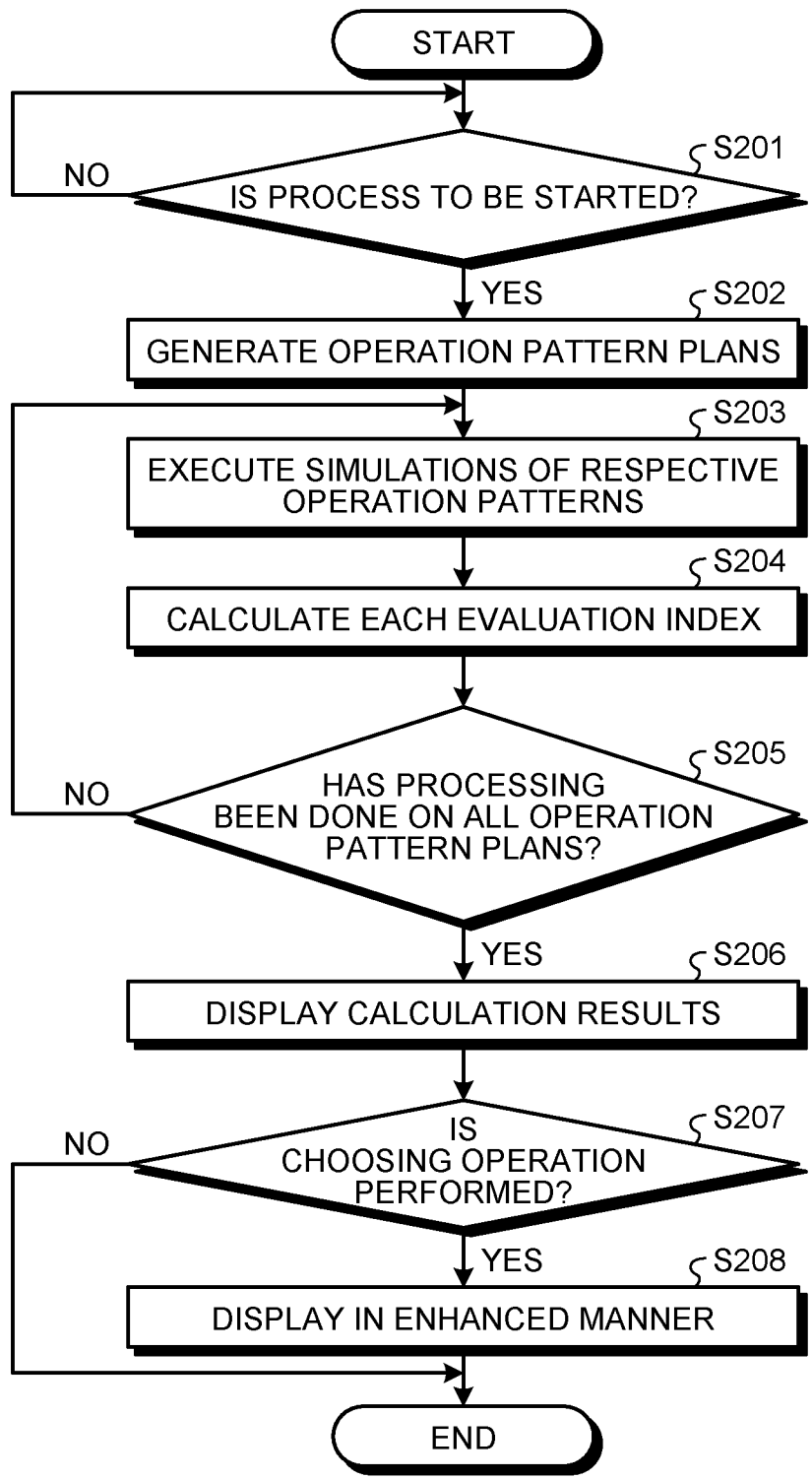
FIG. 14 is a flowchart illustrating a flow of a calculation process.

FIG. 14 is a flowchart illustrating a flow of a calculation process. As illustrated in FIG. 14, when an instruction to start the process is issued (YES at S201), the second calculation unit 52 generates a plurality of operation pattern plans (S202).

The second calculation unit 52 receives an input of a simulation period, executes a simulation on each of the operation pattern plans (S203) and calculates a plurality of evaluation indices (S204). When there is an unprocessed operation pattern plan (NO at S205), the second calculation unit 52 repeats step S203 and the following steps.

On the other hand, when simulations of all the operation pattern plans complete (YES at S205), the display processor 60 displays the evaluation indices as calculation results in a specified form (S206).

When a choosing operation is received on the screen on which the calculation results are displayed (YES at S207), the display processor 60 displays the chosen operation pattern plan in an enhanced manner (S208).

Effect

As described above, the information processing device 10 is able to present, to the worker, or the like, the content of operations of a plurality of operation pattern plans and calculation results that are the state of the actual plant 1 that is calculated when the operation pattern plans are executed. As a result, the worker, or the like, is able to choose a more appropriate operation pattern.

The information processing device 10 is able to present a plurality of operation pattern plans with different calculation results. As a result, the worker, or the like, is able to choose an operation pattern plan corresponding to a state that the user of the actual plant 1 desires easily and in short time and thus both safe operations and appropriate plant operations can be realized.

Second Embodiment

The information processing device 10 is able to not only present virtual operation patterns but also evaluate an actual operation that is performed by the worker, or the like. In a second embodiment, an example in which an operation performed by the worker, or the like, is evaluated will be described.

Evaluation Example 1

Figure 15:
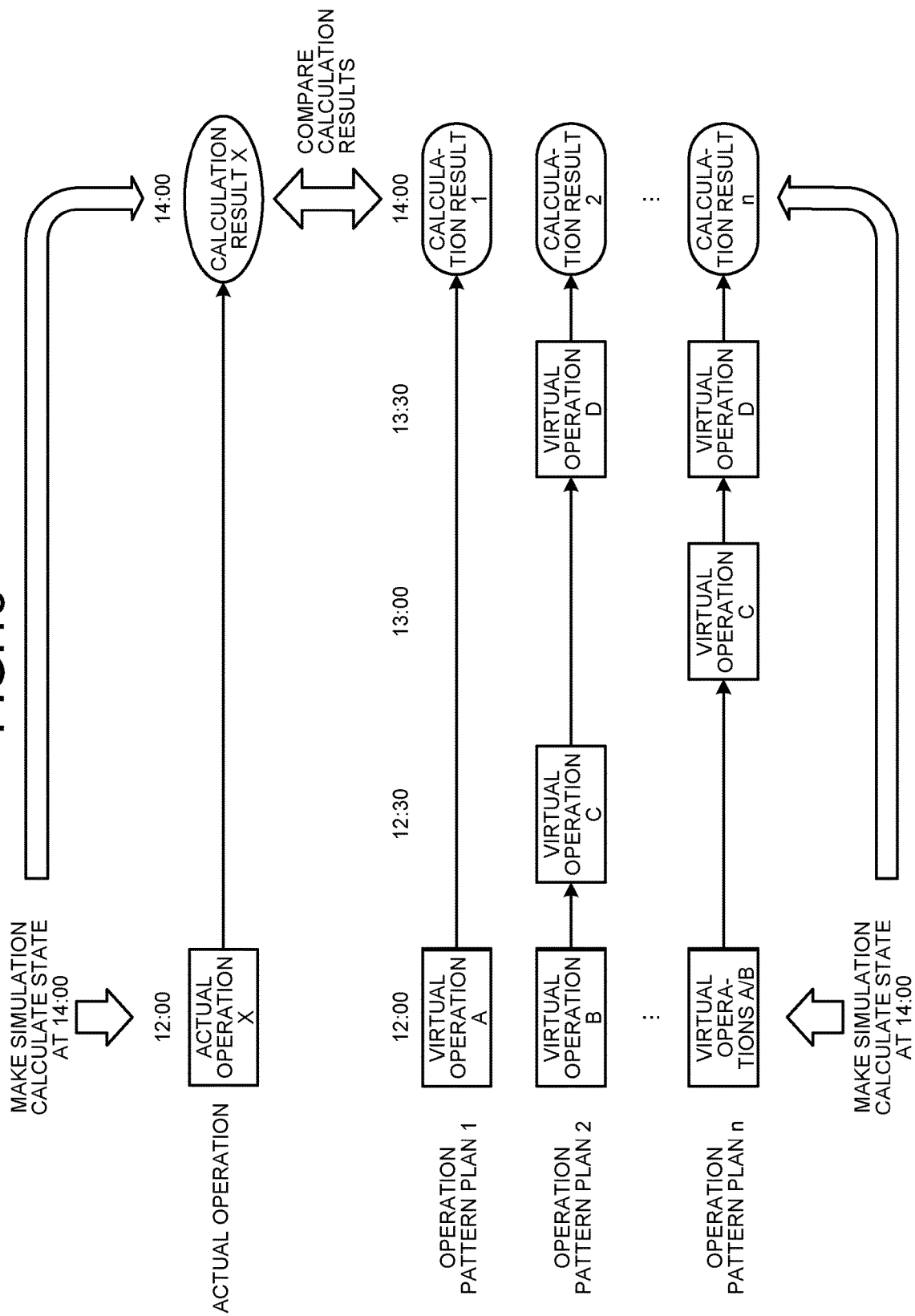
FIG. 15 is a diagram illustrating an actual operation evaluation example 1.

For example, the information processing device 10 is able to execute a simulation at the point when an actual operation is performed by the worker, or the like, and evaluate the actual operation. FIG. 15 is a diagram illustrating an actual operation evaluation example 1. As illustrated in FIG. 15, when an actual operation X is executed at "12:00", the second calculation unit 52 acquires information operation on the operation that is executed actually. The second calculation unit 52 then receives an input of a time "14:00" on which a simulation is to be performed from the operator, or the like, calculate a state of the actual plant 1 at "14:00" at the point of the time of operation "12:00", and generates a calculation result X that is an example of a first calculation result.

On the other hand, the second calculation unit 52 calculates evaluation indices at "14:00" at the point of "12:00" with respect to each of the operation pattern plans 1 to n using the same method as that of the first embodiment and generates calculation results 1 to n that are an example of respective second calculation results. Note that an operation pattern plan 1 is a pattern in which the virtual operation A is executed at 12:00. An operation pattern plan 2 is a pattern in which the virtual operation B is executed at 12:00, the virtual operation C is executed at 12:30, and a virtual operation D is executed at 13:30. The operation pattern plan n is a pattern in which the virtual operation A and the virtual operation B are executed at 12:00, the virtual operation C is executed at 13:00, and the virtual operation D is executed at 13:30.

Thereafter, the second calculation unit 52 generates and displays evaluation results obtained by comparing an evaluation result X that is obtained by a simulation based on the actual operation X and each of the calculation results that are obtained by simulations based on the respective operation pattern plans. For example, the second calculation unit 52 makes a comparison according to the similarity between a calculation result that is chosen by the manager, or the like, as a reference of evaluation among the calculation results or a calculation result corresponding to a SOP and the calculation result X based on the actual operation X. For example, the second calculation unit 52 calculates a similarity of each of the evaluation indices contained in each of the calculation results and, evaluates that the similarity is rated high when the similarity is at or above a threshold, and evaluates that the similarity is rated low when the similarity is under the threshold. The second calculation unit 52 is also able to make an evaluation based on the evaluation result X and the final target value.

In consideration of a rate of reaction of the behaviors of the actual plant 1, a plant state value (plant data) that is acquired at the timing of execution of an actual operation or the timing of execution of a virtual operation can include a value after reaction caused by execution of the actual operation or execution of the virtual operation and a value before the reaction caused by execution of the actual operation or execution of the virtual operation (the value before reflection of the response because of the rate of reaction). In other words, in a simulation based on the actual operation X, the second calculation unit 52 may calculate a plant state at 14:00 using operation information on the actual operation X at 12:00 and the process state value before the reaction caused by the actual operation X. Similarly, in a simulation based on the virtual operation X, the second calculation unit 52 may calculate a plant state at 14:00 using operation information on the virtual operation X at 12:00 and a process state value before the reaction caused by a virtual operation X. In other words, the process state value at the point of 12:00 that is acquired in the simulation according to the actual operation X and the process state value at the point of 12:00 that is acquired in the simulation of the virtual operation X are the same or approximately the same with a small error.

Figure 16:
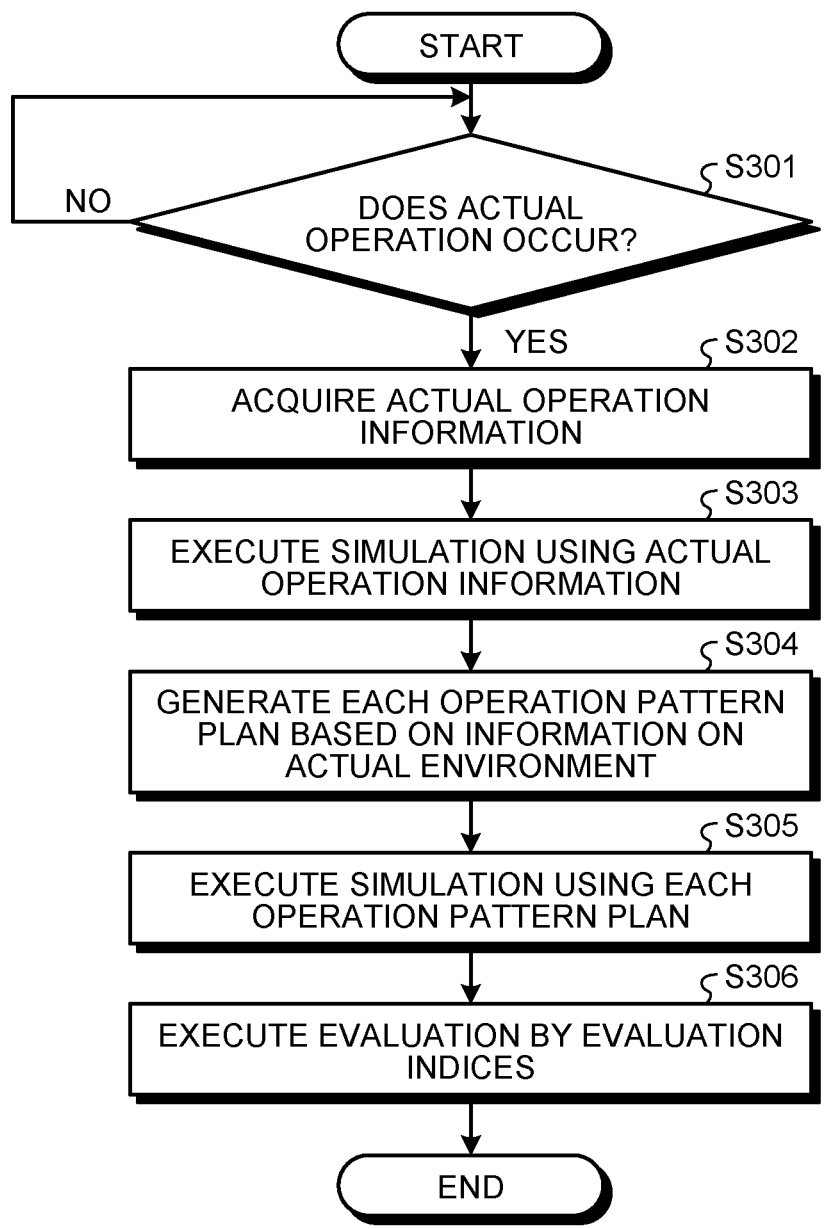
FIG. 16 is a flowchart illustrating a flow of a process of the evaluation example 1.

FIG. 16 is a flowchart illustrating a flow of a process of the evaluation example 1. As illustrated in FIG. 16, when an actual operation executed by the worker, or the like, occurs (YES at S301), the second calculation unit 52 acquires information on the executed actual operation from the actual plant 1 or an operation log (S302).

Subsequently, the second calculation unit 52 executes a simulation using the information on the actual operation and generates an evaluation result of evaluation indices (S303). The second calculation unit 52 generates each operation pattern plan based on information on an actual environment that can be acquired by the actual plant 1 (S304), executes simulations using the respective operation patterns, and generates respective calculation results of evaluation indices (S305).

Thereafter, the second calculation unit 52 evaluates the actual operation that is executed by the worker, or the like, using the calculation result of evaluation indices based on the actual operation and each of the calculation results of evaluation indices based on the respective operation pattern plans (S306).

Evaluation Example 2

Figure 17:
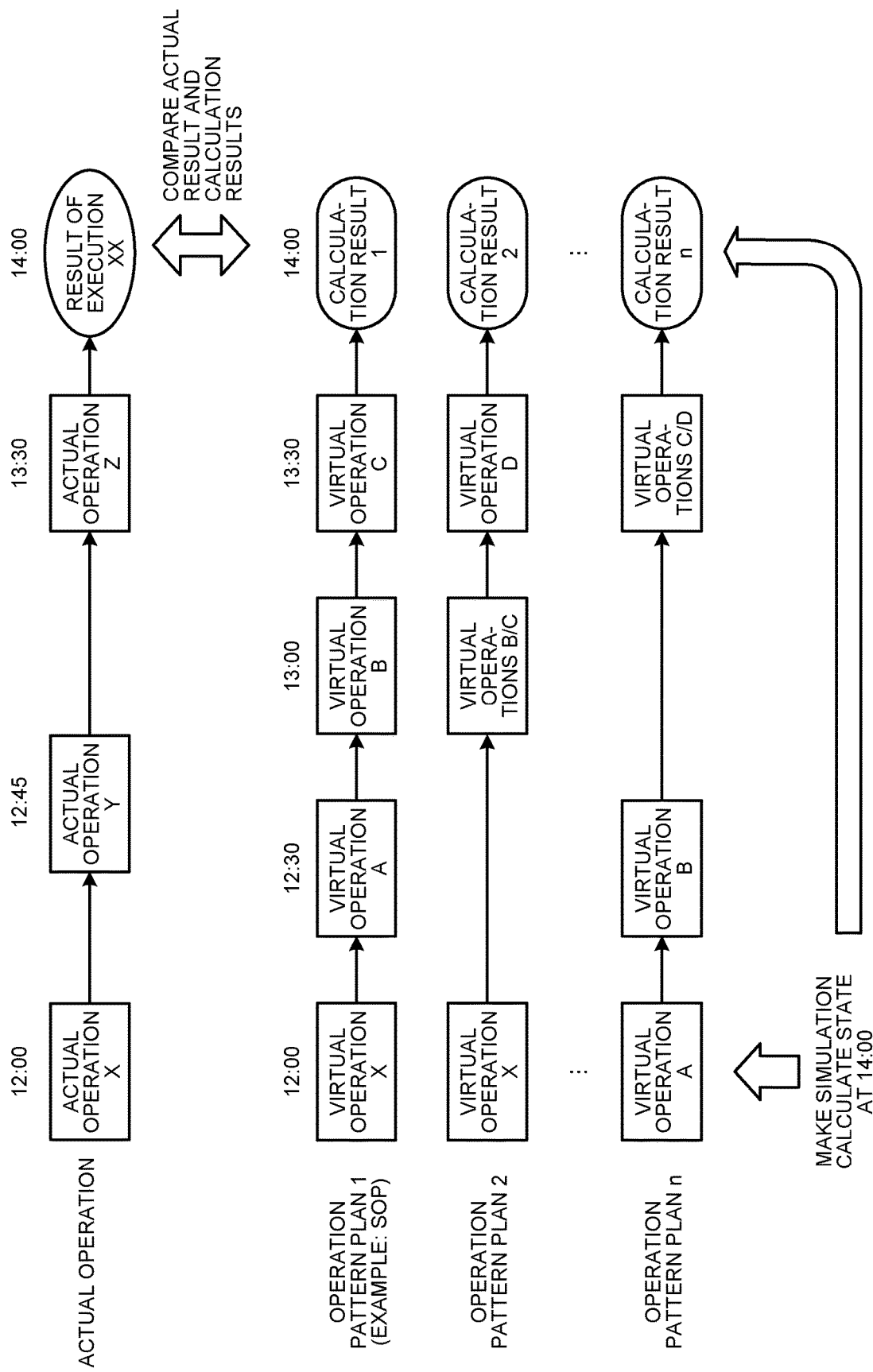
FIG. 17 is a diagram illustrating an actual operation evaluation example 2.

For example, after a series of actual operations that are performed by the worker, or the like, completes, the information processing device 10 is able to evaluate the series of actual operations. FIG. 17 is a diagram illustrating an actual operation evaluation example 2. As illustrated in FIG. 17, when the actual operation X that is the first one of the series of actual operations is executed at "12:00", the second calculation unit 52 calculates evaluation indices at "14:00" at the point of "12:00" with respect to each of operation pattern plans 1 to n using the same method as that of the first embodiment. In other words, the second calculation unit 52 generates, with respect to each of the respective operation pattern plans, each calculation result obtained by calculating a state (evaluation indices) of the actual plant 1 at 14:00 at the point of 12:00 when the actual operation X is executed.

The operation pattern plan 1 is a pattern in which the virtual operation X is executed at 12:00, the virtual operation A is executed at 12:30, the virtual operation B is executed at 13:00, and the virtual operation C is executed at 13:30 and is the same as the SOP of the actual plant 1. The operation pattern plan 2 is a pattern in which the virtual operation X is executed at 12:00, the virtual operation B and the virtual operation C are executed at 13:00, and the virtual operation D is executed at 13:30. An operation pattern plan n is a pattern in which the virtual operation A is executed at 12:00, the virtual operation B is executed at 12:30, and the virtual operation C and the virtual operation D are executed at 13:30. A simulation period can be specified previously or can be specified each time and the setting can changed freely.

Thereafter, the worker, or the like, executes an actual operation Y at 12:45 and executes an actual operation Z at 13:30. When 14:00 comes, the second calculation unit 52 acquires an execution result XX at the point of 14:00 as the result of execution of the actual operation X at 12:00, the actual operation Y at 12:45, and the actual operation Z at 13:30. The second calculation unit 52 acquires each of the evaluation indices described above from the actual plant 1 as the execution result XX.

The second calculation unit 52 makes an evaluation according to similarity between the calculation result that is chosen as a reference of evaluation by the manager, or the like, from among the calculation results or the calculation result corresponding to the SOP and the execution result XX based on the actual operation X. The second calculation unit 52 is also able to make an evaluation based on similarity between the execution result XX and a final target value.

Third Embodiment

The information processing device 10 is also able to execute a simulation of a virtual operation pattern that is assumed when a failure occurs and present evaluation indices to the worker, or the like. In a third embodiment, an example in which a plurality of operation pattern plans are presented when a failure occurs and this enables the worker, or the like, to deal with the failure appropriately will be described.

Figure 18:
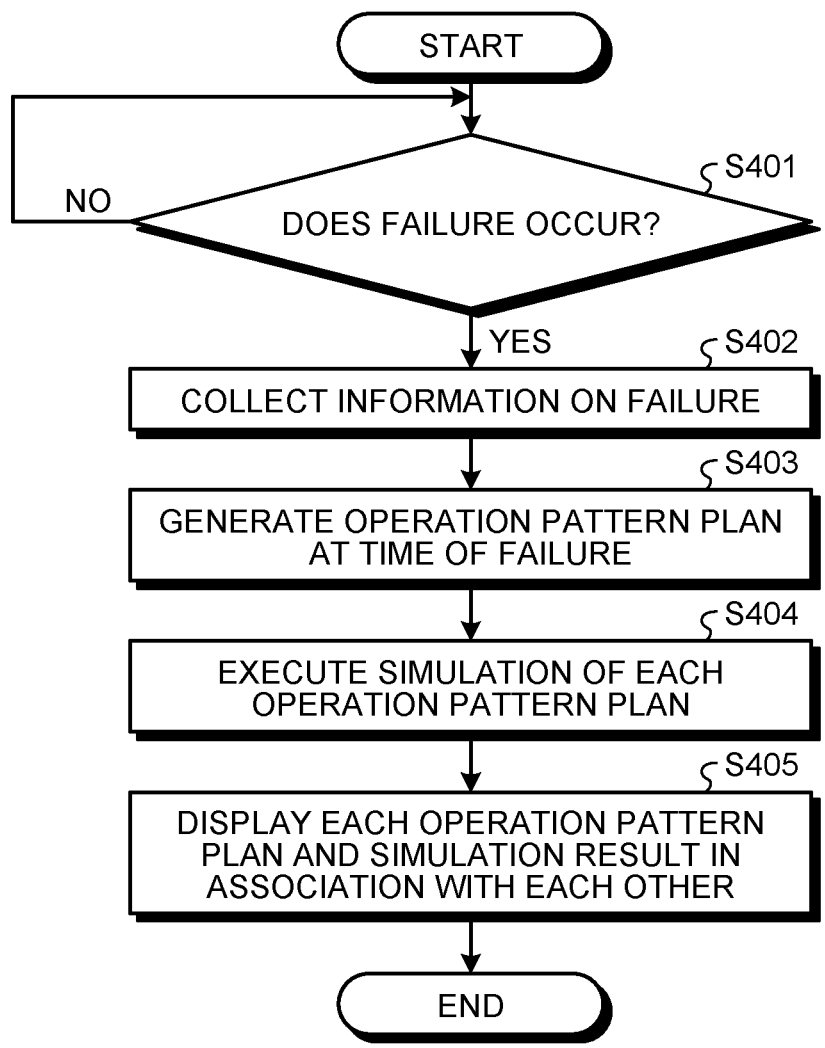
FIG. 18 is a flowchart illustrating a flow of a process of displaying an operation pattern plan when a failure occurs.

FIG. 18 is a flowchart illustrating a flow of a process of displaying an operation pattern plan when a failure occurs. As illustrated in FIG. 18, when a failure occurs (YES at S401), the second calculation unit 52 collects information on the failure (S402). For example, the second calculation unit 52 acquires the site of occurrence of the failure, the time of occurrence of the failure, a failure message, an affected site, information on whether the operation stops, etc., from the actual plant 1 according to an operation to be performed at the time of failure.

The second calculation unit 52 then generates at least one operation pattern at the time of failure (S403). For example, the second calculation unit 52 refers to a failure handling log in the past, etc., and generates handling of failure corresponding to the information on the failure as the operation pattern plan at the time of failure.

The second calculation unit 52 then executes a simulation of each operation pattern plan and calculates each calculation result of evaluation indices (S404). For example, the second calculation unit 52 executes a simulation using the method illustrated in the first embodiment or the second embodiment.

The second calculation unit 52 then displays each operation pattern plan and the simulation result (calculation result) in association with each other (S405). For example, the second calculation unit 52 makes a display comparably using a matrix form, or the like. As a result, the worker, or the like, is able to check an appropriate operation pattern plan corresponding to the status of failure or an appropriate operation pattern plan corresponding to a request for recovery. For example, when it is necessary to recover the production first, the worker, or the like, is able to check an operation pattern plan with the highest production calculation result among the operation pattern plans.

Fourth Embodiment

The embodiments of the disclosure have been described, and the disclosure may be carried out in various modes in addition to the above-described embodiments.
Numerical Values, etc.

The examples of screen display, the time, the example of each tag, the evaluation indices, and the operation pattern plans that are used in the above-described embodiments are an example only, and they may be changed freely. Each simulation can employ a physical model that is generated previously. Furthermore, each simulation may employ, for example, a machine learning model that is generated using training data in which an input of the content of operation (an explanatory variable), such as the temperature, and an output (objective variable), such as the value of tag, are associated with each other.
Operation Pattern For example, an operation pattern that the second calculation unit 52 generates virtually may be an operation pattern corresponding to an operation tag or may be an operation pattern that relates to the whole actual plant 1 or the whole mirror plant 100 and that contain a plurality of operation tags. Each operation pattern is not limited to the SOP, and it may be an operation pattern of a skilled worker that is digitized. Simulations are not limited to simulation per operation, and a plurality of operations may be simulated collectively.
Automatic Execution of Operation Pattern The information processing device 10 is also able to actually execute an operation pattern plan that is chosen by the worker, or the like, from among a plurality of operation pattern plans. For example, the information processing device 10 displays the calculation results of the operation pattern plans comparably using the form illustrated in FIGS. 8 to 10 and, when an operation pattern plan 1 is chosen, automatically executes the operation pattern plan 1. In other words, the information processing device 10 actually executes the virtual operation A on the actual plant 1 at 12:30, actually executes the virtual operation B at 13:00 on the actual plant 1, and executes the virtual operation C at 13:30 on the actual plant 1.

The information processing device 10 is also able to, for example, execute an operation guidance in addition to automatic execution of a chosen operation pattern plan. According to the above-described example, the information processing device 10 displays a message announcing the timing of execution of the virtual operation A when 12:30 comes, displays a message announcing the timing of execution of the virtual operation B when 13:00 comes, and displays a message announcing the timing of execution of the virtual operation C when 13:30 comes.
System The process procedure, control procedure, specific names, and information including various types of data and parameters that are presented in the above description and the drawings are changeable freely unless otherwise noted.

Each component of each device illustrated in the drawings is a functional idea and need not necessarily be configured physically as illustrated in the drawings. In other words, specific modes of distribution and integration of devices are not limited to those illustrated in the drawings. In other words, all or part of the devices can be configured by functional or physical distribution or integration in any unit according to various types of load and usage.

Figure 19:
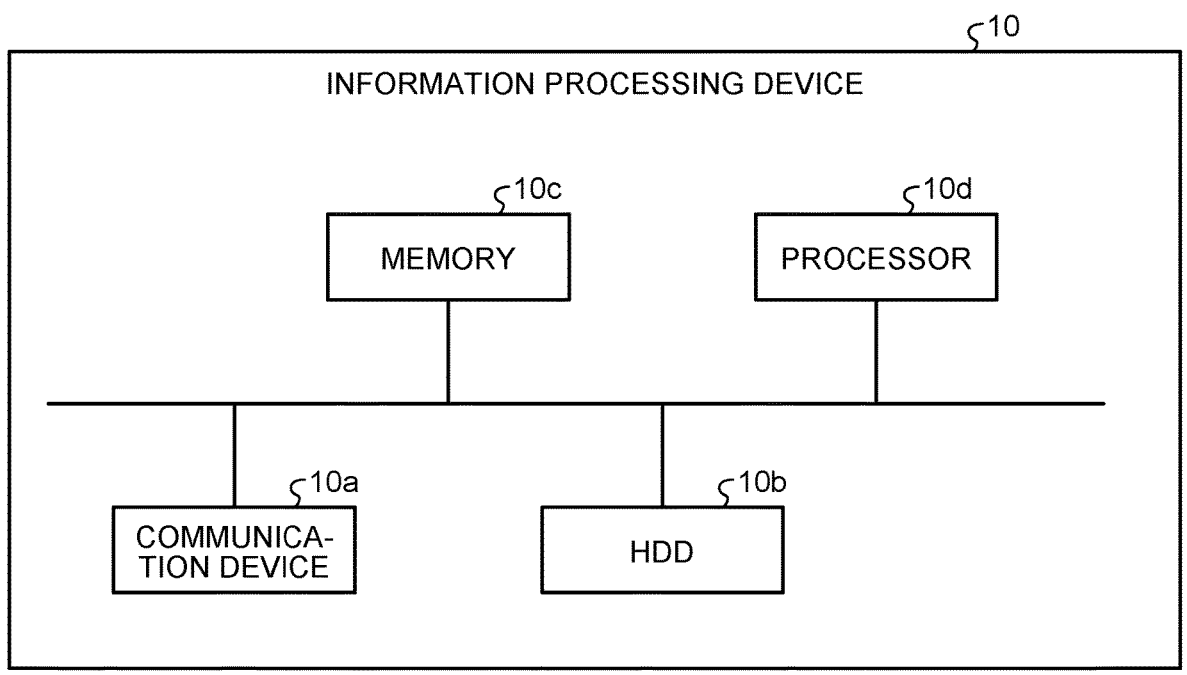
FIG. 19 is a diagram illustrating an example of a hardware configuration.

Furthermore, all or given part of each processing function implemented by each device can be implemented by a CPU or a program that is analyzed and executed by the CPU or can be implemented as hardware according to a wired logic.
Hardware An example of a hardware configuration of the information processing device 10 will be described next. FIG. 19 is a diagram illustrating the example of the hardware configuration. As illustrated in FIG. 19, the information processing device 10 includes a communication device 10a, a hard disk drive (HDD) 10b, a memory 10c, and a processor 10d. The units illustrated in FIG. 19 are connected mutually by a bus, or the like.

The communication device 10a is a network interface card, or the like, and communicates with another server. The HDD 10b stores the program that implements the functions illustrated in FIG. 2 and the DB.

The processor 10d reads the program that executes the same process as that of each of the processors illustrated in FIG. 2 from the HDD 10b, or the like, and loads the program in the memory 10c, thereby running the process that implements each of the functions illustrated in FIG. 2, etc. For example, the process executes the same function as that of each of the functions that the information processing device 10 includes. Specifically, the processor 10d reads the program with the same functions as those of the mirror processor 30, the identification processor 40, the calculation processor 50, the display processor 60, etc., from the HDD 10b, or the like. The processor 10d executes the process that executes the same processing as that performed by the mirror processor 30, the identification processor 40, the calculation processor 50, the display processor 60, etc.

As described above, the information processing device 10 runs as an information processing device that executes various processing methods by reading and executing the program. The information processing device 10 may read the above-described program from a recording medium using a medium reading device and execute the read program, thereby implementing the same functions as those of the above-described embodiments. Other programs according to other embodiments are not limited to being executed by the information processing device 10. For example, the disclosure is similarly applicable to the case where another computer or another server executes the program or the computer and the server executes the program cooperatively.

The program can be distributed via a network, such as the Internet. The program can be recorded in a computer-readable recording medium, such as a hard disk, a flexible disk (FD), a CD-ROM, a magneto-optical disk (MO), or a digital versatile disc (DVD), can be read by a computer from the recording medium, and thus can be executed.

According to an embodiment, it is possible to evaluate an operation performed by a worker, or the like, in charge of operating a plant.

What is claimed is:
1. An information processing device comprising a processor configured to:
execute a mirror model to simulate behaviors of an actual plant while acquiring data from the actual plant and at the same time estimating a quantity of state that is not measured in the actual plant;
adjust an error between the mirror model and the actual plant by updating values of parameters and variables of the mirror model based on actual measured data of the actual plant;
execute a first simulation using the mirror model by using an actual operation that is executed by a worker in the actual plant as an input to calculate a first future operational state of the actual plant, thereby generating a first calculation result;
execute a second simulation using the mirror model by using each one of a plurality of virtual operations contained in each one of a plurality of operation pattern plans as an input to calculate a second future operational state of the actual plant, thereby generating each second calculation result; and
compare the first calculation result and the each second calculation result, thereby evaluating the actual operation that is executed by the worker.

2. The information processing device according to claim 1, wherein the processor is further configured to:
receive choosing of a second calculation result serving as a reference of evaluation from the second calculation results corresponding to the operation pattern plans, respectively;
calculate a similarity between the chosen second calculation result and the first calculation result; and
evaluate that the similarity is rated high when the similarity is at or above a threshold and evaluate that the similarity is rated low when the similarity is under the threshold.

3. The information processing device according to claim 1, wherein the processor is further configured to:
acquire the state of the actual plant after execution of a plurality of actual operations by the worker within a given time;
with respect to each of the operation pattern plans corresponding to the state of the actual plant that is acquired before or after execution of first one of the actual operations, generate each of the second calculation results obtained by calculating a behavior of the actual plant after elapse of the given time from the first one of the actual operations using the mirror model; and
evaluate the actual operation that is executed by the worker by comparing the state of the actual plant after execution of the actual operations and each of the second calculation results.

4. The information processing device according to claim 1, the processor is further configured to display the each second calculation result and contents of the plurality of virtual operations contained in one of the plurality of operation pattern plans.

5. A computer-implemented evaluation method comprising:
executing, by a processor, a mirror model to simulate behaviors of an actual plant while acquiring data from the actual plant and at the same time estimating a quantity of state that is not measured in the actual plant;
adjusting, by the processor, an error between the mirror model and the actual plant by updating values of parameters and variables of the mirror model based on actual measured data of the actual plant;
executing, by the processor, a first simulation using the mirror model by using an actual operation that is executed by a worker in the actual plant as an input to calculate a first future operational state of the actual plant, thereby generating a first calculation result;
executing, by the processor, a second simulation using the mirror model by using each one of a plurality of virtual operations contained in each one of a plurality of operation pattern plans as an input to calculate a second future operational state of the actual plant, thereby generating each second calculation result; and
comparing, by the processor, the first calculation result and the each second calculation result, thereby evaluating the actual operation that is executed by the worker.

6. The evaluation method according to claim 5, further comprising displaying, by the processor, the each second calculation result and contents of the plurality of virtual operations contained in one of the plurality of operation pattern plans.

7. A non-transitory computer-readable recording medium having stored therein an evaluation program that causes a computer to perform a process comprising:

executing a mirror model to simulate behaviors of an actual plant while acquiring data from the actual plant and at the same time estimating a quantity of state that is not measured in the actual plant;

adjusting an error between the mirror model and the actual plant by updating values of parameters and variables of the mirror model based on actual measured data of the actual plant;

executing a first simulation using the mirror model by using an actual operation that is executed by a worker in the actual plant as an input to calculate a first future operational state of the actual plant, thereby generating a first calculation result;

executing a second simulation using the mirror model by using each one of a plurality of virtual operations contained in each one of a plurality of operation pattern plans as an input to calculate a second future operational state of the actual plant, thereby generating each second calculation result; and comparing the first calculation result and the each second calculation result, thereby evaluating the actual operation that is executed by the worker.

8. The non-transitory computer-readable recording medium according to claim 7, wherein the process further comprises displaying the each second calculation result and contents of the plurality of virtual operations contained in one of the plurality of operation pattern plans.

* * * * *